United States Patent
Kan et al.

(10) Patent No.: US 7,860,867 B2
(45) Date of Patent: Dec. 28, 2010

(54) INFORMATION MANAGING SYSTEM, INFORMATION MANAGING METHOD, AND INFORMATION MANAGING PROGRAM FOR MANAGING VARIOUS ITEMS OF INFORMATION OF OBJECTS TO BE RETRIEVED

(75) Inventors: Masaki Kan, Tokyo (JP); Junichi Yamato, Tokyo (JP); Yuji Kaneko, Tokyo (JP); Yoshihiro Kajiki, Tokyo (JP)

(73) Assignee: NEC Corporation, Tokyo (JP)

( * ) Notice: Subject to any disclaimer, the term of this patent is extended or adjusted under 35 U.S.C. 154(b) by 461 days.

(21) Appl. No.: 11/641,735

(22) Filed: Dec. 20, 2006

(65) Prior Publication Data

US 2007/0174275 A1 Jul. 26, 2007

(30) Foreign Application Priority Data

Jan. 25, 2006 (JP) ............................. 2006-016821

(51) Int. Cl.
*G06F 7/32* (2006.01)
(52) U.S. Cl. .................................................... 707/739
(58) Field of Classification Search .................. 707/739, 707/749, 748
See application file for complete search history.

(56) References Cited

U.S. PATENT DOCUMENTS

| 5,611,064 | A | * | 3/1997 | Maund et al. ............... 711/209 |
| 5,991,756 | A | * | 11/1999 | Wu ............................... 707/3 |
| 6,134,532 | A | | 10/2000 | Lazarus et al. |
| 6,311,198 | B1 | | 10/2001 | Uramoto et al. |
| 2004/0027329 | A1 | * | 2/2004 | Nakamura ................... 345/156 |
| 2004/0193751 | A1 | * | 9/2004 | Singh et al. ................... 710/15 |
| 2005/0114661 | A1 | * | 5/2005 | Cheng et al. ................ 713/167 |

FOREIGN PATENT DOCUMENTS

| JP | 05-128157 | 5/1993 |
| JP | 06-251081 | 9/1994 |
| JP | 11-053387 | 2/1999 |
| JP | 2000-020555 | 1/2000 |

* cited by examiner

*Primary Examiner*—James Trujillo
*Assistant Examiner*—Fatima P Mina
(74) *Attorney, Agent, or Firm*—Foley & Lardner LLP

(57) ABSTRACT

An information managing system includes a parameter setting unit for setting a parameter representative of an attribute of a user and information to be retrieved, and an information relevance space generator for generating an information relevance space representative of information indicating a relevance between the user and the information to be retrieved, based on the parameter set by the parameter setting unit.

20 Claims, 11 Drawing Sheets

INFORMATION MANAGING SYSTEM, INFORMATION MANAGING METHOD, AND INFORMATION MANAGING PROGRAM FOR MANAGING VARIOUS ITEMS OF INFORMATION OF OBJECTS TO BE RETRIEVED

BACKGROUND OF THE INVENTION

1. Field of the Invention

The present invention relates to an information managing system, an information managing method, and an information managing program for managing various items of information of objects to be retrieved, and more particularly to an information managing system, an information managing method, and an information managing program which are capable of assisting users in retrieving information.

2. Description of the Related Art

When the user is to retrieve a file or a piece of information, it is the general practice for the user to use a full-text retrieval system or a retrieval system similar to a full-text retrieval system. Specifically, the user enters a keyword indicative of contents to be retrieved (hereinafter referred to as "retrieval query") into the retrieval system. The retrieval system then outputs a sequence of items of information relevant to the retrieval query as a list. The user retrieves desired information based on the list.

According to another process of retrieving a file or a piece of information, the user classifies and saves files using directories in advance. Then, the user retrieves a desired file by browsing the directory tree.

JP-A No. 2000-20555 discloses a method of providing user-appropriate information based on a user profile vector determined by the action of the user and a contents vector determined by the contents of information.

According to the retrieval processes using the retrieval system and the directory tree, unless the user explicitly recognizes the information of an object to be retrieved, the user is unable to retrieve appropriate information and file. For example, unless the user produces a keyword with respect to contents to be retrieved for keyword-based retrieval, the user fails to retrieve desired information. Therefore, even though the user uses one of the above retrieval processes, it is difficult for the user to find useful information that the user has not recognized. The reason is that the user cannot retrieve information unless the user specifies objects to be retrieved.

According to the method disclosed in JP-A No. 2000-20555, it is possible to provide the user with information taking to some extent into account the relevance between the action of the user and the contents of information. However, the disclosed method is unable to provide the user with information taking into account the relevance between a plurality of items of information. Therefore, the user cannot be provided with useful information representing the relevance between a plurality of items of information.

SUMMARY OF THE INVENTION

It is an object of the present invention to provide an information managing system, an information managing method, and an information managing program which are capable of providing the user with relevant information and also of providing the user with useful information.

To achieve the above object, there is provided in accordance with the present invention an information managing system comprises a parameter setting unit and an information relevance space generator. The parameter setting unit, which may comprise parameter setting unit 21, for example, sets a parameter representative of an attribute of a user and information to be retrieved, e.g., a time parameter, a user parameter, or a relevance parameter. The information relevance space generator, which may comprise information relevance space generator 1, for example, generates an information relevance space representative of information indicating relevance between the user and the information to be retrieved, based on the parameter set by the parameter setting unit.

The information managing system should preferably has an output controller. The output controller, which may comprise display screen generator 3, for example, generates output information for outputting the information to be retrieved based on the information relevance space generated by the information relevance space generator, e.g., screen information of a display screen or an output file.

In the information managing system, the information relevance space generator may comprise a weighting unit. The weighting unit, which may comprise information relevance space generator 1, for example, generates the information relevance space by weighting nodes which are represented respectively by the user and the information to be retrieved.

The information managing system may further comprise an information relevance space manipulator. The information relevance space manipulator, which may comprise information relevance space manipulator 2, for example, instructs the information relevance space generator to change the generated information relevance space at a given time. The information relevance space generator should desirably change weights applied to the nodes to regenerate an information relevance space according to an instruction from the information relevance space manipulator.

In the information managing system, the information relevance space manipulator may comprise an event detector and a change instructor. The event detector, which may comprise information relevance space manipulator 2, for example, detects a predetermined event. The change instructor, which may comprise information relevance space manipulator 2, for example, instructs the information relevance space generator to change the information relevance space based on the event detected by the event detector.

In the information managing system, the output controller may generate screen information of a display screen including an weight adjuster for changing weights applied to the nodes. The information relevance space manipulator may instruct the information relevance space generator to change the information relevance space in response to an instruction to change the weights applied to the nodes which is input from the weight adjuster by the user. The weight adjuster may comprise slide bar 1501 or 1502.

According to the present invention, there is also provided an information managing system comprising an information relevance space generator, a point-of-view selector, and an output controller. The information relevance space generator generates an information relevance space representative of information indicating relevance between a user and information to be retrieved. The point-of-view selector, which may comprise field-of-vision manipulator 4, for example, selects a point of view in the information relevance space for displaying the information to be retrieved. The output controller generates screen information of a display screen for displaying information included in a predetermined distance from the point of view selected by the point-of-view selector, among information included in the information relevance space generated by the information relevance space generator.

In the information managing system, the output controller may generate screen information of a display screen including identifying information representative of nodes. When the user selects and inputs identifying information from the display screen, the point-of-view selector may select a node corresponding to the selected and input identifying information as a point of view in the information relevance space for displaying the information to be retrieved.

The information managing system may further comprise a point-of-view adder. The point-of-view adder, which may be implemented by a CPU of an information processing apparatus which operates according to a program, for example, adds, to an ACL (Access Control List) parameter, point-of-view information representative of a point of view in the information relevance space for displaying the information to be retrieved. The point-of-view selector should preferably select a point of view in the information relevance space for displaying the information to be retrieved, based on the point-of-view information added to the ACL parameter.

The information managing system may further comprise a charge information storage unit for storing charge information, and a point-of-view changer for changing the point-of-view information added to the ACL parameter. The point-of-view changer changes the point-of-view information added to the ACL parameter based on the charge information stored in the charge information storage unit. The charge information storage unit comprises charge information storage unit 9, for example, and the point-of-view changer is implemented by a CPU of an information processing apparatus which operates according to a program, for example.

An information managing system according to the present invention may comprise an information relevance space generator, a field-of-vision setting unit, and an output controller. The information relevance space generator generates an information relevance space representative of information indicating relevance between a user and information to be retrieved. The field-of-vision setting unit, which may comprise field-of-vision manipulator 4, sets a field of vision in the information relevance space for displaying the information to be retrieved. The output controller generates screen information of a display screen for displaying information included in the field of vision set by the field-of-vision setting unit, among information included in the information relevance space generated by the information relevance space generator.

In the information managing system, the output controller may generate screen information of a display screen including a field-of-vision adjuster for changing the field of vision in the information relevance space for displaying the information to be retrieved. The field-of-vision setting unit may change the field of vision in the information relevance space for displaying the information to be retrieved in response to an instruction to change the field of vision which is input from the field-of-vision adjuster by the user. The field-of-vision adjuster may comprise slider 81, for example.

In the information managing system, the information relevance space generator may use the user and the information to be retrieved as nodes. The information managing system may further comprise a parameter copying unit for copying a parameter of a node other than a particular node to the particular node. The information relevance space generator may generate the information relevance space based on the parameter copied by the parameter copying unit. The parameter copying unit may be implemented by a CPU of an information processing apparatus which operates according to a program, for example.

The information managing system may further comprise a setting information specifying unit for specifying a predetermined node with predetermined setting information. The parameter copying unit may copy a parameter of the node specified by the setting information to the particular node when the information relevance space is newly generated. The setting information specifying unit may be implemented by a CPU of an information processing apparatus which operates according to a program, for example.

In the information managing system, the information relevance space generator may generate an information relevance space including elements representative of the information to be retrieved and placed in a virtual space of plural dimensions as information representative of the relevance between the user and the information to be retrieved.

In the information managing system, the information relevance space generator may generate an information relevance space including elements representative of users and placed in a virtual space of plural dimensions.

In the information managing system, the information relevance space generator may update the information relevance space by moving elements placed in a virtual space of plural dimensions.

According to the present invention, there is further provided a method of managing information, comprising the steps of setting a parameter representative of an attribute of a user and information to be retrieved, and generating an information relevance space representative of information indicating relevance between the user and the information to be retrieved, based on the set parameter.

The method may further comprise the steps of generating screen information of a display screen including an weight adjuster for changing weights applied to nodes which are represented respectively by the user and the information to be retrieved, and changing the information relevance space in response to an instruction to change the weights applied to the nodes which is input from the weight adjuster by the user.

The method may further comprise the steps of generating screen information of a display screen including a field-of-vision adjuster for changing a field of vision in the information relevance space for displaying the information to be retrieved, and changing the field of vision in the information relevance space for displaying the information to be retrieved in response to an instruction to change the field of vision which is input from the field-of-vision adjuster by the user.

According to the present invention, there is further provided an information managing program for enabling a computer to perform a process comprising the steps of setting a parameter representative of an attribute of a user and information to be retrieved, and generating an information relevance space representative of information indicating a relevance between the user and the information to be retrieved, based on the set parameter.

In the information managing program, the process may further comprise the steps of generating screen information of a display screen including an weight adjuster for changing weights applied to nodes which are represented respectively by the user and the information to be retrieved, and changing the information relevance space in response to an instruction to change the weights applied to the nodes which is input from the weight adjuster by the user.

In the information managing program, the process may further comprise the steps of generating screen information of a display screen including a field-of-vision adjuster for changing a field of vision in the information relevance space for displaying the information to be retrieved, and changing the field of vision in the information relevance space for displaying the information to be retrieved in response to an instruction to change the field of vision which is input from the field-of-vision adjuster by the user.

An information managing system according to the present invention comprises an information relevance space generator, an information relevance space manipulator, a display screen generator, a field-of-vision manipulator, and an output unit. The information relevance space generator and the information relevance space manipulator generates and maintains an information relevance space representative of a relevance of files, users, or the like by way of mapping. The display screen generator generates screen information of a display screen for presenting information which is possibly useful that is not recognized by the user, using a mapping space. This arrangement makes it possible to achieve the object of the present invention.

According to the present invention, an information relevance space representative of relevance between users and information is generated by way of mapping. It is thus possible to present to the user items of information which do not match an ordinary retrieval condition (e.g., an input keyword) entered by the user and are not displayed under ordinary retrieval, but which are highly relevant to each other and can possibly be used together. That is, mutually relevant information can be presented based on an action of the user. It is easy for the user to discover information which is not recognized by the user, but which is useful to the user. Therefore, it is possible to present relevant information to the user and also to present useful information to the user.

According to the present invention, an information relevance space representative of not only the relevance of the user and information, but also the relevance of users and the relevance of items of information, is generated, and information is presented to the user based on the generated information relevance space. Accordingly, not only information relevant to the user, but also items of useful information that are relevant to each other can be presented to the user.

According to the present invention, an information relevance space can be generated by weighting nodes which represent a user and information to be retrieved. Information can be extracted from the information relevance space with either one of the axes of the mapping space being stressed, and can be presented to the user.

According to the present invention, a point of view in an information relevance space for displaying information to be retrieved can be selected. Consequently, of the information included in the information relevance space, information that is included in a predetermined range around the point of view selected by the user can be presented to the user.

According to the present invention, furthermore, a field of vision in an information relevance space for displaying information to be retrieved can be selected. Consequently, of the information included in the information relevance space, information that is included in the field of vision selected by the user can be presented to the user.

The above and other objects, features, and advantages of the present invention will become apparent from the following description with reference to the accompanying drawings which illustrate an example of the present invention.

DETAILED DESCRIPTION OF THE PREFERRED EMBODIMENTS

1st Mode of Embodiment

Figure 1:
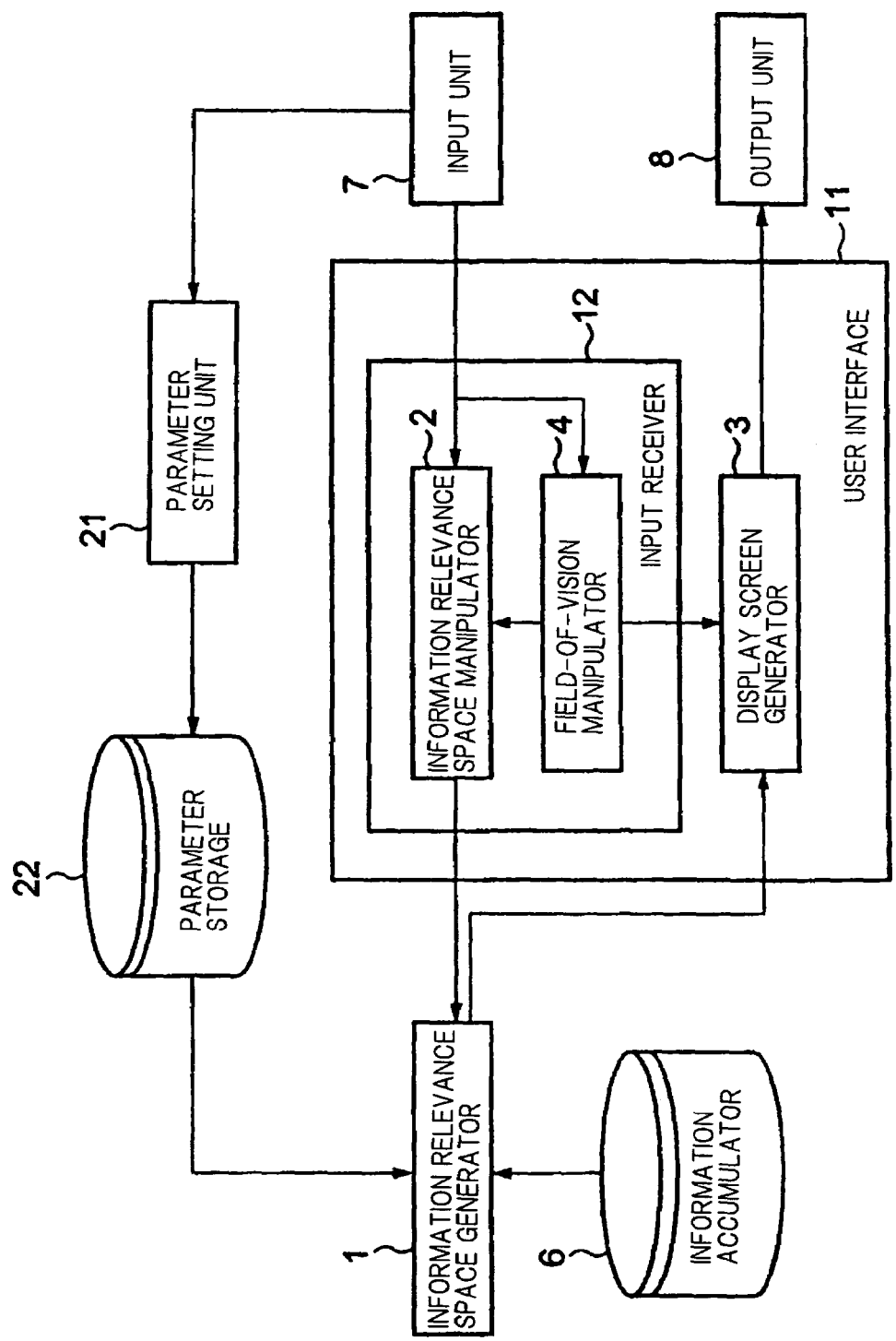
FIG. 1 is a block diagram of an information managing system according to a first mode of embodiment of the present invention.

A first mode of embodiment of the present invention will be described below. FIG. 1 shows in block form an information managing system according to the first mode of embodiment of the present invention. In the present mode of embodiment, the information managing system is specifically implemented by an information processing apparatus such as a workstation, a personal computer, or the like.

As shown in FIG. 1, the information managing system comprises information relevance space generator 1, user interface 11, information accumulator 6, input unit 7, output unit 8, parameter setting unit 21, and parameter storage 22. User interface 11 includes display screen generator 3 and input receiver 12. Input receiver 12 includes information relevance space manipulator 2 and field-of-vision manipulator 4.

Information relevance space generator 1 will hereinafter be referred to simply as "generator 1", information relevance space manipulator 2 as "manipulator 2", and display screen generator 3 as "generator 3".

Generator 1 has a function to generate an information relevance space representing the relevance of a group of information that is stored in information accumulator 6. Manipulator 2 has a function to vary the information relevance space generated by generator 1. Generator 3 has a function to generate a display screen based on the information relevance space generated by generator 1. Field-of-vision manipulator 4 has a function to change a method of presenting the display screen generated by generator 3 and a range in which to present the display screen. Information accumulator 6 stores various items of information to be retrieved. Input unit 7 has a function to enter commands for manipulator 2, field-of-vision manipulator 4, and parameter setting unit 21 in accordance with input actions made by the user. Output unit 8 has a function to output the display screen generated by generator 3. Parameter setting unit 21 has a function to set parameters representing attributes of various items of information to be retrieved and an attribute of the user in accordance with input actions made by the user, and also to save the parameters into parameter storage 22. Parameter storage 22 stores the parameters set by parameter setting unit 21.

Specifically, generator 1 is implemented by a CPU of the information processing apparatus which operates according to a program. Generator 1 reads a group of information (information to be retrieved) from information accumulator 6 and also reads parameters representing attributes of various items of information from parameter storage 22. Based on the parameters, generator 1 generates (calculates) an information relevance space representing the relevance of the group of information stored in information accumulator 6 by way of mapping.

For example, generator 1 generates an information relevance space indicating that the contents of items of information stored in information accumulator 6 are close to each other. Specifically, generator 1 generates an information relevance space indicating that items of information have a common genre or topic or a common word.

Alternatively, generator 1 may generate an information relevance space indicating that the relevance between items of information is high regardless of the contents of the items of information. Specifically, generator 1 may generate an information relevance space indicating files referred to or edited by the same user at the same time (e.g., in a certain period), or may generate an information relevance space indicating files edited by closely related users. The "closely related users" mean, for example, users who are present closely to each other in the information relevance space, users who are closely affiliated in an organization (e.g., a supervisor and a subordinate in the same department), or users who have browsed or edited the same file.

Generator 1 may have a storage unit for storing the calculated information relevance space (e.g., a magnetic disk drive or a memory).

In the present mode of embodiment, the "information relevance space" refers to data representing information to be retrieved and users as elements that are associated with (mapped onto) a mapping space of a given dimension. The information relevance space represents information indicative of the relevance and semantic closeness of items of information stored in information accumulator 6 and also information indicative of the relevance and semantic closeness of users who retrieves and uses items of information stored in information accumulator 6. In the present mode of embodiment, generator 1 generates an information relevance space by placing information of objects to be retrieved onto a certain hypothetical space (mapping space). In the information relevance space, a pointer indicative of the position of a user and information on the hypothetical space (mapping space) is referred to as "node".

The mapping space has axes of several dimensions. Generator 1 generates an information relevance space by mapping nodes representing information, files, and users onto a mapping space. In this case, generator 1 generates an information relevance space by assigning an information attribute to any one of the axes of the mapping space. For example, generator 1 assigns time to an axis of the mapping space or assigns a numerical value representing the relevance to a user to an axis of the mapping space. If the positions of nodes on an information relevance space are closer to each other, then the nodes are semantically closer to each other or more relevant to each other.

In an information relevance space, nodes may be linked to each other. In the present mode of embodiment, if nodes are explicitly related to each other, then generator 1 generates an information relevance space wherein the nodes are linked to each other. For example, generator 1 links the nodes to each other by adding link information indicative of a node to be linked to, to each of the elements mapped onto the mapping space. Whether nodes are linked to each other or not has nothing to do with whether the semantic distance between the nodes is small or not.

Figure 2:
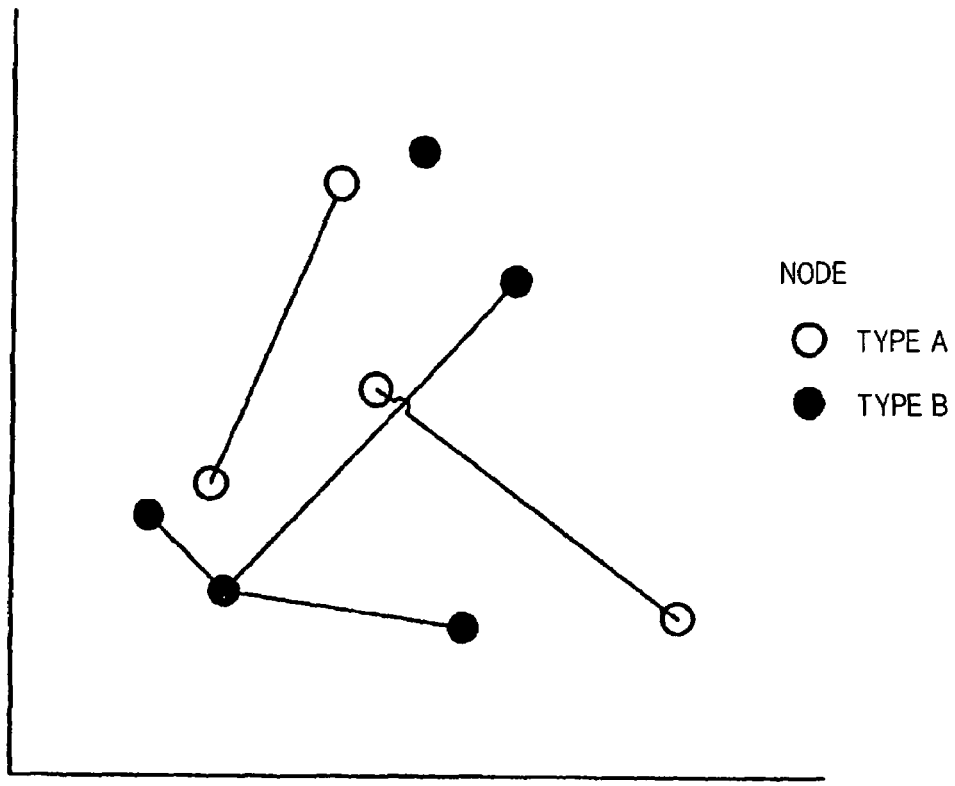
FIG. 2 is a diagram showing the concept of an information relevance space generated by an information relevance space generator of the information managing system shown in FIG. 1.

FIG. 2 shows the concept of an information relevance space generated by generator 1. Specifically, FIG. 2 shows the concept of an information relevance space which employs a mapping space having two-dimensional axes. For example, nodes of type A shown in FIG. 2 represent files stored in information accumulator 6, and nodes of type B represent users. Straight lines interconnecting nodes indicate that the nodes are linked to each other. Generator 1 may generate an information relevance space which employs a three-dimensional mapping space or a mapping space of higher dimensions rather than the two-dimensional mapping space.

In the example shown in FIG. 2, related user nodes are linked to each other. For example, user nodes that have relevance between a supervisor and a subordinate are linked to each other. Related file nodes are linked to each other. For example, file nodes that are simultaneously opened by the same user or file nodes that are opened by the same user in a predetermined period are linked to each other. If whether there is a link or not is used to affect an action to control an information relevance space, then it is possible to hold information as to whether there are semantic closeness and relevance or not, in the information relevance space.

A user (an existing person) may be handled as a single node, or a group of users may be handled as a single node. A user may be a hypothetical person rather than an existing person, and a single person may be handled as a plurality of users.

In the present mode of embodiment, the information managing system has parameter setting unit 21 for setting parameters representative of information attributes. Generator 1 generates an information relevance space based on the parameters thus set.

Generator 1 has a weighting unit for weighting parameters of each of nodes representing users and items of information to be retrieved. Specifically, the weighting unit is implemented by the CPU of the information processing apparatus which operates according to a program. Specifically, generator 1 generates an information relevance space by weighting parameters of each of nodes.

Generator 1 generates an information relevance space wherein nodes indicative of items of information to be retrieved are placed in a hypothetical space of several dimensions, as information representative of the relevance of users and items of information to be retrieved. Generator 1 also generates an information relevance space wherein nodes indicative of users are placed in a hypothetical space of several dimensions. Generator 1 updates the information relevance space by moving the nodes placed in the hypothetical space of several dimensions.

Generator 1 also has a function to vary (update) the positions of nodes in an information relevance space in accordance with information or commands received from manipulator 2. Specifically, generator 1 varies the weighting of each node in accordance with an instruction from manipulator 2, thereby generating an information relevance space again. In the weighting varying process, generator 1 may newly calculate an information relevance space each time the position of a node is varied. Alternatively, generator 1 may calculate an information relevance space again, using an information relevance space recorded (stored) in the memory of generator 1. Specifically, generator 1 updates an information relevance space stored in the memory in accordance with information or an instruction received from manipulator 2. This function may be performed by parameter setting unit 21 as it updates parameters.

Using an information relevance space recorded in the memory is effective to reduce the amount of calculations performed to calculate an information relevance space for thereby shortening the time required to generate a display screen as described later. If information relevance spaces in the past are stored, then information can be retrieved using an information relevance space at a time in the past, so that the retrieval efficiency is increased for the user.

User interface 11 includes input receiver 12 and generator 3. User interface 11 receives has a function to receive an input signal according to a command from the user and retrieve information in information accumulator 6. Input receiver 12 includes manipulator 2 and field-of-vision manipulator 4. Input receiver 12 has a function to receive an input signal in accordance with a user's command from input unit 7, and controls generator 3 to regenerate screen information of a display screen as required.

Specifically, manipulator 2 is implemented by the CPU of the information processing apparatus which operates according to a program. Manipulator 2 has a function to affect an information relevance space to vary the position of a node in the information relevance space. In the present mode of embodiment, manipulator 2 instructs generator 2 to vary an information relevance space. Specifically, manipulator 2 instructs generator 1 to update an information relevance space at a predetermined time.

Manipulator 2 may provide an interface for allowing the user to give a command for directly varying the position of a node in an information relevance space. Specifically, the user operates input unit 7 to enter an instruction to vary the position of a node in the information relevance space, and manipulator 2 instructs generator 1 to vary the information relevance space in accordance with the instruction entered by the user. Manipulator 2 may give generator 1 an instruction to vary an information relevance space based on a matter not involving the user, such as the elapse of a time or the like.

Manipulator 2 also has a function to detect an event for varying an information relevance space based on an input action entered from input unit 7, and give an instruction to vary the information relevance space. In this case, based on the instruction from manipulator 2, generator 1 weights the parameters of each of nodes included in the information relevance space, thereby updating the information relevance space.

The event for varying an information relevance space may be, for example, an event for the user to select important information among attribute information of files at the time the user retrieves files. In this case, based on the instruction from manipulator 2, generator 1 changes a method of generating an information relevance space in order to increase the effect of attribute information selected by the user, and updates the information relevance space.

The event for varying an information relevance space may be, for example, an event caused when the user makes an action to edit a file. In this case, based on the instruction from manipulator 2, generator 1 weights each of the nodes in order to reduce the distance between the user node and the node of the edited file, i.e., in order to increase the relevance, and maps the weighted nodes. Furthermore, based on the instruction from manipulator 2, generator 1 weights each of the nodes in order to reduce the distance between the nodes of a plurality of files edited at the same time (in a given period), and maps the weighted nodes. These processes may not be performed by manipulator 2, but may be performed based on parameter updating by parameter setting unit 21 and corresponding mapping by generator 1.

The event for varying an information relevance space may be, for example, an event caused when a time elapses. In this case, if it is detected that a file has not been edited or browsed for a certain period, then based on the instruction from manipulator 2, generator 1 weights each of the nodes in order to increase the distance between the user node and the file node, i.e., in order to reduce the relevance. If there is a file (or a directory) to be edited periodically (e.g., once in every week), for example, then based on the instruction from manipulator 2, generator 1 weights each of the nodes in order to reduce the distance between the node of the file to be edited periodically and the user node. These processes may not be performed by manipulator 2, but may be performed based on parameter updating by parameter setting unit 21 and corresponding mapping by generator 1.

Even if the present name of a file does not agree with the initial name thereof due to the function to vary an information relevance space, the information relevance space is repeatedly varied until the file is placed in an appropriate position as a node position in the information relevance space. Therefore, the user is not required to perform periodic maintenance on file names. Manipulator 2 automatically places a file in an appropriate position in the information relevance space based on a file control action. Therefore, the user is not necessarily required to assign file names. These processes may not be performed by manipulator 2, but may be performed based on parameter updating by parameter setting unit 21 and corresponding mapping by generator 1.

Generator 3 is implemented by the CPU of the information processing apparatus which operates according to a program. Generator 3 has a function to generate screen information of a display screen for displaying information for the user, based on the information relevance space generated by generator 1. In this case, based on specifying information specified by field-of-vision manipulator 4, generator 3 generates screen information of a display screen for displaying information included in the information relevance space. If no specifying information is specified by field-of-vision manipulator 4, then generator 3 may generate screen information of a display screen based on predetermined setting information.

In the present mode of embodiment, a display screen for displaying information included in an information relevance space is displayed on a display unit or the like. However, the information managing system may generate a predetermined output file containing information included in an information relevance space.

Field-of-vision manipulator 4 is implemented by the CPU of the information processing apparatus which operates according to a program. Field-of-vision manipulator 4 has a function to generate specific information for adjusting the field of vision of a display screen to be displayed for the user, i.e., a display range and contents of a display screen for displaying information extracted from the information relevance space (hereinafter referred to as "field-of-vision specifying information"). Stated otherwise, field-of-vision manipulator 4 sets a field-of-vision range in an information relevance space for displaying information to be retrieved.

Field-of-vision manipulator 4 has a function to transfer generated field-of-vision specifying information to generator 3. In the present mode of embodiment, field-of-vision manipulator 4 transfers an instruction to adjust the field of vision of a display screen to generator 3 based on explicit information entered by the user or an implicit event such as the system clock.

Field-of-vision manipulator 4 also has a function to select a point of view in an information relevance space for displaying information to be retrieved. Generator 3 generates screen information of a display screen for displaying information that is included in a predetermined distance from a point of view selected by field-of-vision manipulator 4, among the information included in the information relevance space. Alternatively, generator 3 generates screen information of a display screen from the information of an information relevance space generated by generator 1 around a point of view selected by field-of-vision manipulator 4. Field-of-view manipulator 4 may have a function to change or recalculate an information relevance space. Field-of-view manipulator 4 may give an instruction to change an information relevance space to manipulator 2 or may transfer the instruction to generator 1.

Information accumulator 6 is implemented by a storage unit such as a magnetic disk drive or an optical disk drive. Information accumulator 6 is a storage unit for accumulating in advance objects to be retrieved by the user, i.e., files and information to be retrieved by the user. For example, information accumulator 6 accumulates in advance data such as document data, graphic data, and graph data. Meta information may be assigned to the information accumulated in information accumulator 6. In this case, generator 1 may generate an information relevance space by way of mapping, using the meta information assigned to the information accumulated in information accumulator 6.

Input unit 7 is implemented by an input unit such as a keyboard and a mouse. Input unit 7 enters a command from the user to retrieve a file, manipulate a file, and edit a file.

Output unit 8 is implemented by a display unit or the like. Output unit 8 presents a display screen to the user based on the screen information generated by generator 3.

Parameter setting unit 21 is implemented by the CPU of the information processing apparatus which operates according to a program. Parameter setting unit 21 sets information to be retrieved and attribute information of the user (parameters) in accordance with input actions made by the user and entered from input unit 7. Parameter setting unit 21 has a function to record the parameters in parameter storage 22.

Parameter storage 22 is implemented by a storage unit such as a magnetic disk drive or an optical disk drive. Parameter storage 22 stores the information to be retrieved and the attribute information of the user which have been set by parameter setting unit 21.

In the present mode of embodiment, the storage unit of the information processing apparatus implemented as the information managing system stores various programs for managing files and information to be retrieved. For example, the storage unit of the information processing apparatus stores an information managing program for enabling a computer to perform a process of setting parameters indicative of attributes of users and information to be retrieved, and a process of generating an information relevance space representative of information indicating the relevance of users and information to be retrieved, by way of mapping, based on the parameters.

Operation of the information managing system will be described below. First, a mode of operation for generator 1 to generate an information relevance space will be described below. Generator 1 generates an information relevance space by placing various items of information stored in information accumulator 6 as elements in a mapping space. First, generator 1 reads data serving as information elements or meta information from information accumulator 6. Generator 1 calculates the positions of the read information elements in the mapping space, and places the information elements in the mapping space according to the calculated positions.

Alternatively, generator 1 may present an interface for determining a position in the mapping space to the user, and may seek a command for the position of the information element in the mapping space. Specifically, the user operates the information processing apparatus to enter initial positions of respective information elements. Then, generator 1 generates an information relevance space wherein information elements are placed in a mapping space, in accordance with the initial positions specified by the user. Even if the initial positions are specified arbitrarily, the information relevance space is repeatedly varied to update the information relevance space, thereby generating an information relevance space wherein information elements (nodes) are placed in appropriate positions.

If necessary, generator 1 records the generated information relevance space in a given storage location, e.g., a given storage area of a magnetic disk drive or a memory. Alternatively, generator 1 may process a record (information relevance space) calculated in the past and recorded in a predetermined storage area thereby to calculate an information relevance space. Further alternatively, generator 1 may calculate a new information relevance space without using past records each time an information relevance space is to be generated.

Figure 3:
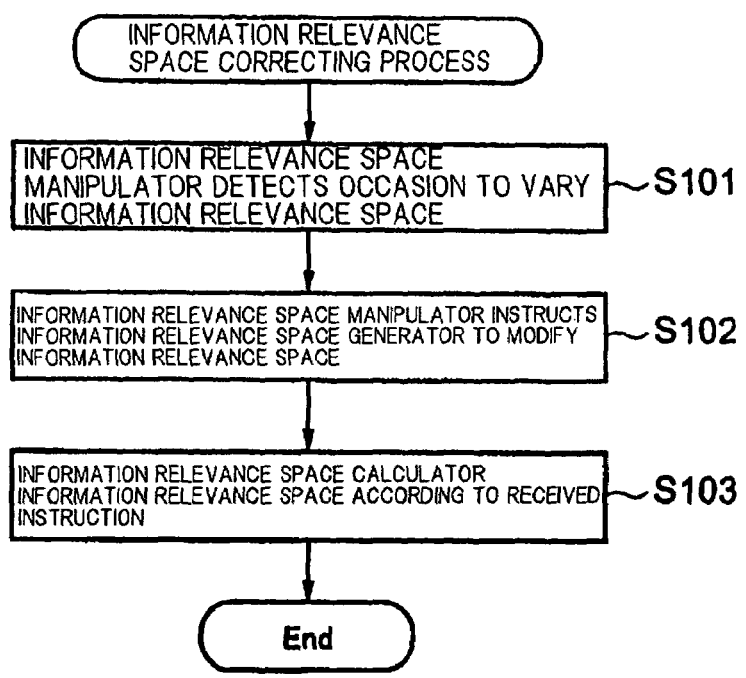
FIG. 3 is a flowchart of an information relevance information correcting process for correcting an information relevance space.

A mode of operation for manipulator 2 to correct (update) an information relevance space will be described below. FIG. 3 is a flowchart of an information relevance space correcting process for correcting an information relevance space. As shown in FIG. 3, manipulator 2 detects an occasion, e.g., an event, to vary an information relevance space based on an input signal from input unit 7 (step S101). For example, if manipulator 2 detects a command entered by the user to manipulate a file or edit a file, then manipulator 2 judges that an event, i.e., an occasion, to vary an information relevance space has occurred. Manipulator 2 may alternatively detect an environmental change such as a change in time, rather than a command entered by the user, as an occasion to vary an information relevance space.

Then, based on the detected event, manipulator 2 instructs generator 1 to modify an information relevance space as indicated by the event (step S102). In accordance with an instruction received from manipulator 2, generator 1 corrects an information relevance space (step S103). Specifically, generator 1 weights each of nodes in the information relevance space to update the information relevance space according to the instruction from manipulator 2.

A mode of operation for generator 3 to generate screen information of a display screen will be described below. First, generator 3 acquires the information relevance space generated by generator 1. For example, generator 3 extracts an information relevance space stored in a given storage area. Then, generator 3 generates or processes screen information of a display screen to be presented to the user, based on the acquired information relevance space. Generator 3 presents (outputs) the generated screen information to output unit 8. Generator 3 also regenerates screen information of a display screen when it receives an input signal from field-of-vision manipulator 4.

Field-of-vision manipulator 4 detects an explicit command from the user (e.g., a command entered by the user) or an implicit command (e.g., a predetermined time based on the system clock), and transfers the detected command to generator 3. According to the command from field-of-vision manipulator 4, generator 3 regenerates screen information of a display screen. Output unit 8 displays the display screen again based on the screen information regenerated by generator 3.

Figure 4:
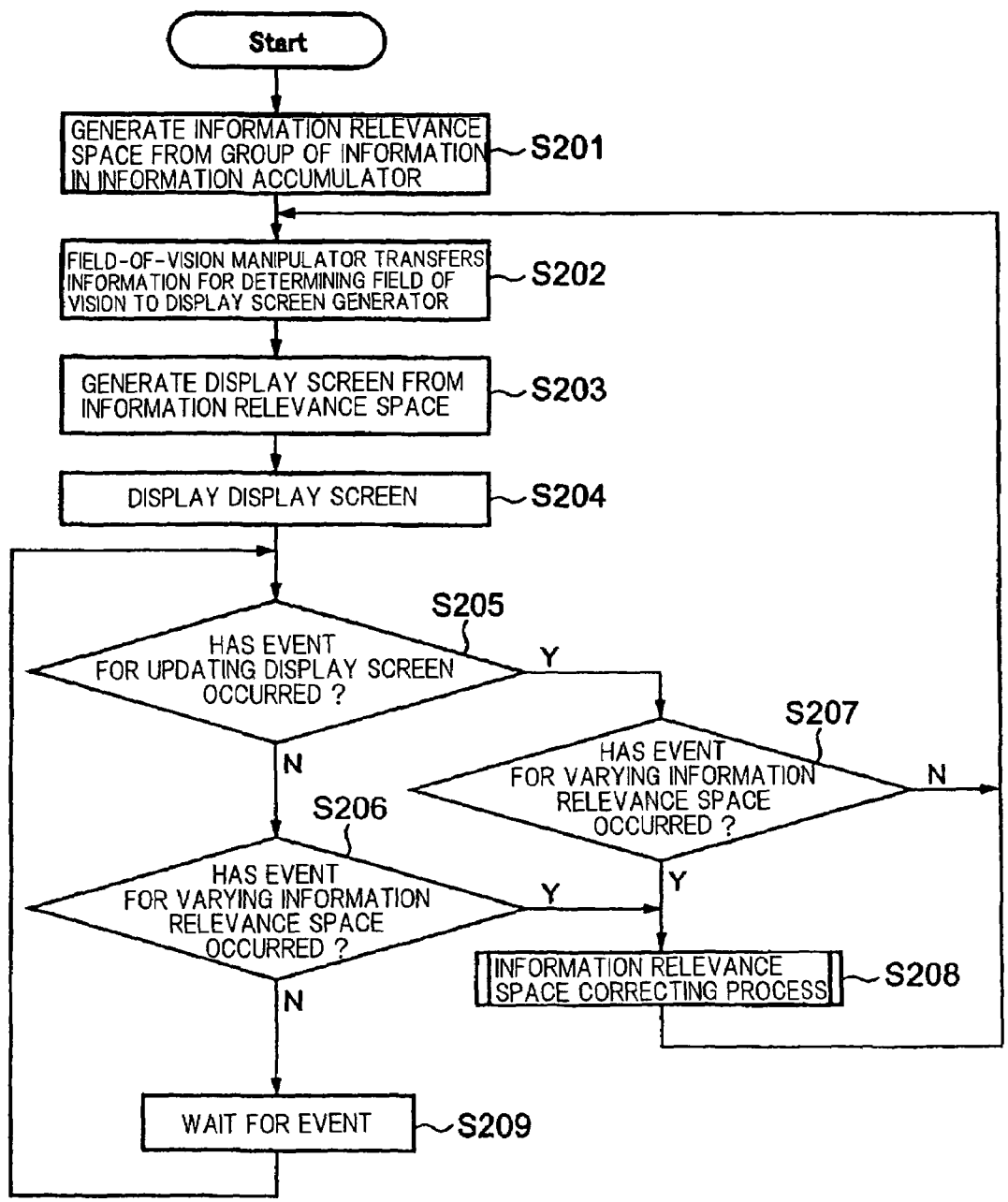
FIG. 4 is a flowchart showing by way of example a processing sequence that is performed by the information managing system when the user makes an action for information retrieval.

Overall operation of the information managing system at the time the user makes an action for information retrieval will be described below. FIG. 4 is a flowchart showing by way of example a processing sequence that is performed by the information managing system when the user makes an action for information retrieval.

As shown in FIG. 4, generator 1 of the information managing system generates an information relevance space by way of mapping based on information or meta information accumulated in information accumulator 6 (step S201). However, generator 1 is not required to generate an information relevance space each time the user makes an action for information retrieval, but may correct the information in the past to update an information relevance space when a node is added. Generator 1 may record an information relevance space on any occasion, and may record an information relevance space at any time in the past.

Then, if the user wants to adjust the field of vision of a display screen, the user operates input unit 7 to specify a field of vision. Based on the information entered from input unit 7 by the user, field-of-vision manipulator 4 generates field-of-vision specifying information for determining a field of vision. Then, field-of-vision manipulator 4 transfers the generated field-of-vision specifying information to generator 3 (step S202). Field-of-vision manipulator 4 may generate field-of-vision specifying information using not only an explicit command entered from input unit 7 by the user, but also predetermined standard information in the information managing system or information entered in the past. Alternatively, field-of-vision manipulator 4 may generate field-of-vision specifying information based on an explicit command entered from input unit 7 by the user each time the user makes an action for information retrieval.

Then, generator 3 receives mapping space information (an information relevance space) from generator 1. For example, when field-of-vision specifying information is entered from field-of-vision manipulator 4, generator 3 requests an information relevance space from generator 1. In response to the request from generator 3, generator 1 extracts an information relevance space from a given storage area. Generator 1 then transfers the extracted information relevance space to generator 3.

Based on the field-of-vision specifying information to determine a field of vision, which has been obtained in step S202, i.e., entered from field-of-vision manipulator 4, and the information relevance space, generator 3 generates screen information of a display screen. Generator 3 then transfers the generated screen information to output unit 8 (step S203). Based on the received (input) screen information, output unit 8 plots (outputs) the display screen (step S204). For example, output unit 8 displays the display screen on a display unit or the like based on the screen information.

The user views the screen output by output unit 8, and makes an action through input unit 7. Manipulator 2 determines whether an event has occurred due to an action made by the user or not. If manipulator 2 judges that an event has occurred, then manipulator 2 determines whether an event for updating the display screen has occurred or not based on an action made by the user through input unit 7. Field-of-vision manipulator 4 determines whether an event has occurred or not based on an action made by the user. If field-of-vision manipulator 4 judges that an event has occurred, then field-of-vision manipulator 4 determines whether an event for updating the display screen has occurred or not based on an action made by the user through input unit 7 (step S205).

If manipulator 2 judges that the event which has occurred is not an event for updating the display screen based on the information relevance space, then manipulator 2 determines whether the event which has occurred is an event for varying the information relevance space or not (step S206). If it is judged in step S206 that the event which has occurred is not an event for varying the information relevance space, then the information managing system is put into a mode for waiting for an event for varying the information relevance space or an event for updating the display screen (step S209). In other words, manipulator 2 or field-of-vision manipulator 4 waits for an input signal representing an event based on an action made by the user through input unit 7. In the waiting mode, control goes back to step S205 and the processing from step S205 is repeatedly performed.

If it is judged in step S205 that an event for updating the display screen has occurred, then manipulator 2 determines whether the event which has occurred is an event for varying the information relevance space or not (step S207). If it is judged in step S206 that the event which has occurred is not an event for varying the information relevance space, then control goes back to step S202 and the processing from step S202 is performed again.

The event which is an event for updating the display screen, but not an event for varying the information relevance space is, for example, an event that is detected by field-of-vision manipulator 4, i.e., an event that is detected by only field-of-vision manipulator 4 and is not detected by manipulator 2. It is assumed that field-of-vision manipulator 4 has detected an event. If the event that has occurred is an event detected by field-of-vision manipulator 4, then the information managing system performs again the processing from step S202 to step S204 based on the field-of-vision specifying information for determining a field of vision which is changed by the event that has occurred.

If it is judged in step S207 that the event which has occurred is an event for varying the information relevance space, i.e., the event which has occurred is an event detected by manipulator 2, then control goes to step S208 in which the information managing system performs the information relevance information correcting process shown in FIG. 3. The information managing system performs the processing from step S101 to step S103 shown in FIG. 3, and control goes back to step S202. Then, the information managing system repeatedly performs the processing from step S202.

If it is judged in step S206 that the event which has occurred is an event for varying the information relevance space, then the information managing system also performs the information relevance information correcting process in step S208. In the flowchart shown in FIG. 4, the information managing system generates again screen information of a display screen when the information relevance space is varied. However, the information managing system may generate screen information of a display screen out of synchronism with the varying of the information relevance space. Stated otherwise, even though the information relevance space is varied, the information managing system may not cause the varied information relevance space to immediately affect the present display screen. Instead, the information managing system may allow the display screen to reflect the varied information relevance space only when the display screen is plotted (displayed) next time or only when the user uses the display screen for subsequent information retrieval.

The event which is detected as an event for updating the display screen in step S205 and as an event for not varying the information relevance space in step S207 is an event for changing the point of view and an event for changing the field of vision, for example. An event for changing a start point occurs when the user makes an action to change the point of view through the user interface, and is detected by field-of-vision manipulator 4. An event for changing the field of vision occurs when the user makes an action to change the field of vision through the user interface, and is detected by field-of-vision manipulator 4.

The event which is detected as an event for updating the display screen in step S205 and as an event for varying the information relevance space in step S207 is an information relevance space varying event, for example. The information relevance space varying event is an event for varying a weight with manipulator 2, and is detected by manipulator 2.

The event which is not detected as an event for updating the display screen in step S205 and as an event for varying the information relevance space in step S206 is an event for changing a parameter. The event for changing a parameter is an event for changing a parameter with parameter setting unit 21. In this case, generator 1 may recalculate the existing information relevance space at any time. Generator 1 may recalculate an information relevance space when a parameter is changed or may recalculate an information relevance space at any time irrespective of the changing of a parameter.

The above event is judged as being negative in step S205. Each time a parameter is changed, generator 1 may calculate again an information relevance space in real time and update the display screen.

According to the present mode of embodiment, as described above, the information managing system generates an information relevance space representative of the relevance of users and information, using a mapping space, in accordance with an action of the user. The information managing system then extracts information that is highly relevant to the user and a file, using the generated information relevance space, and displays the extracted information. It is thus possible to present to the user items of information which do not match an ordinary retrieval condition (e.g., an input keyword) entered by the user and are not displayed under ordinary retrieval, but which are highly relevant to each other and can possibly be used together. That is, mutually relevant information can be presented based on an action of the user. It is easy for the user to discover information which is not recognized by the user, but which is useful to the user. Therefore, it is possible to present relevant information to the user and also to present useful information to the user.

According to the present mode of embodiment, an information relevance space representative of not only the relevance of the user and information, but also the relevance of users and the relevance of items of information, is generated, and information is presented to the user based on the generated information relevance space. Accordingly, not only information relevant to the user, but also items of useful information that are relevant to each other can be presented to the user.

2nd Mode of Embodiment

Figure 5:
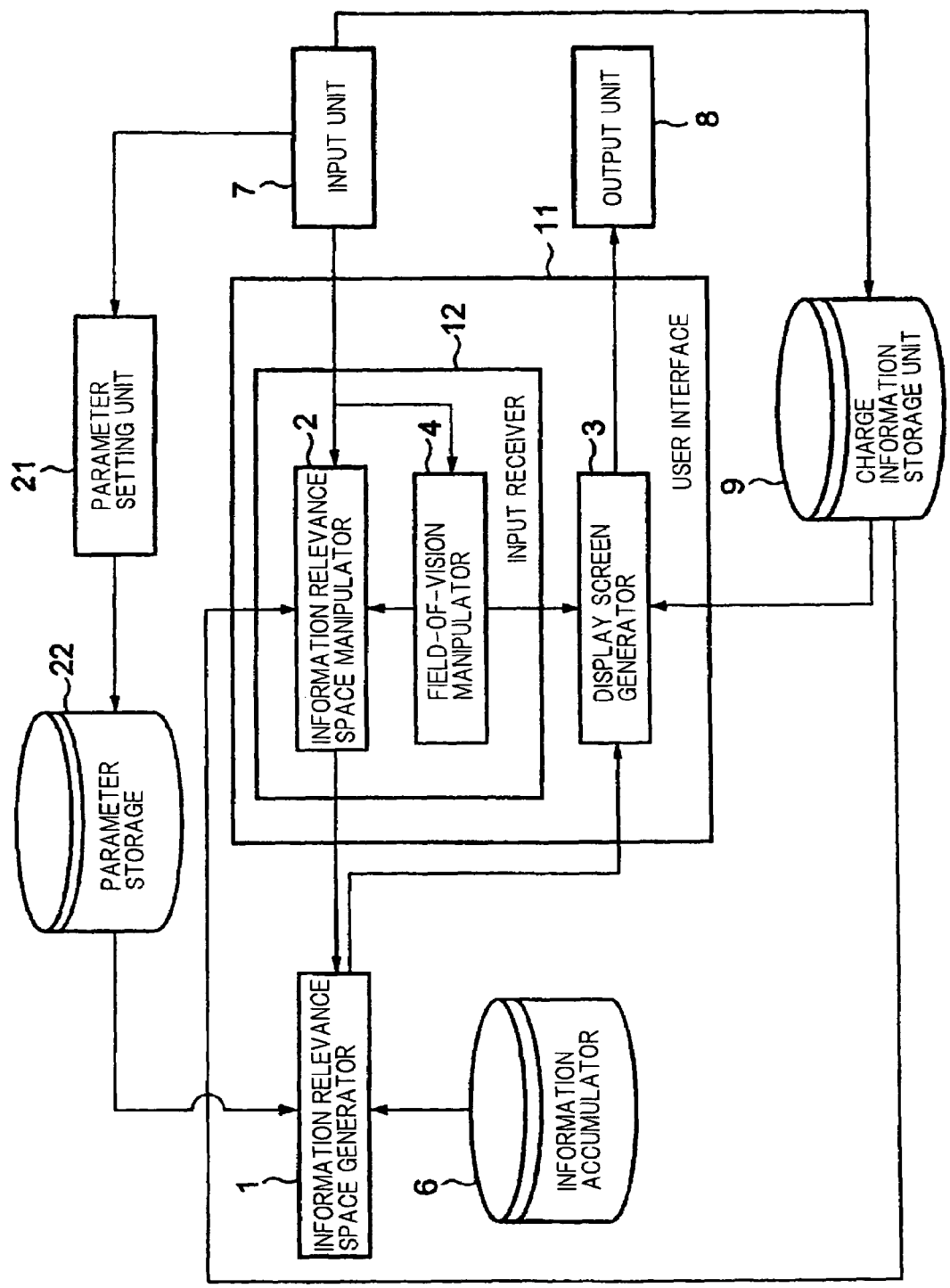
FIG. 5 is a block diagram of an information managing system according to a second mode of embodiment of the present invention.

A second mode of embodiment of the present invention will be described below. FIG. 5 shows in block form another structure of the present invention. As shown in FIG. 5, the information managing system according to the second mode of embodiment differs from the information managing system according to the first mode of embodiment in that it includes charge information storage unit 9 in addition to the components shown in FIG. 1. Manipulator 2 and generator 3 of the information managing system according to the second mode of embodiment have functions different from those of manipulator 2 and generator 3 of the information managing system according to the first mode of embodiment. Configurational details of the information managing system according to the second mode of embodiment are identical to those of the information managing system according to the first mode of embodiment except for charge information storage unit 9.

The information managing system according to the second mode of embodiment is applicable to, for example, a business model for providing an information retrieval service subject to the payment of a predetermined service fee.

Charge information storage unit 9 is implemented by a storage unit such as a magnetic disk drive or an optical disk drive. Charge information storage unit 9 stores user's charge information. Charge information storage unit 9 may store charge information representative of an actual monetary value (e.g., in yen or dollar) or charge information representative of a virtual monetary value that can be used only in a virtual world.

Generator 3 has a function to receive (extract) charge information from charge information storage unit 9 and change, based on the charge information, a method of generating screen information of a display screen based on the information relevance space that is used by the user. Generator 3 also has a function to generate screen information of a display screen according to the changed method. Other functions of generator 3 than the function to change the method of generating screen information of a display screen based on the charge information are the same as those of generator 3 according to the first mode of embodiment.

Manipulator 2 has a function to change a method of modifying an information relevance space based on the charge information stored in charge information storage unit 9. Other functions of manipulator 2 than the function to change the method of modifying an information relevance space based on the charge information are the same as those of manipulator 2 according to the first mode of embodiment.

In the present mode of embodiment, when the user makes a certain action through input unit 7, the information managing system updates the charge information stored in charge information storage unit 9. For example, when a service fee is entailed by a user's action (e.g., an action to retrieve information), the information managing system updates the charge information stored in charge information storage unit 9 based on the entailed service fee.

Operation of the information managing system according to specific embodiments of the present invention will be described below.

1st Embodiment

Information accumulator 6 comprises a hard disk drive of a personal computer owned by the user or an external device such as a NAS (Network Attached Storage) or the like. Information accumulator 6 stores files and a directory (a group of information stored in the form of a directory), as information to be retrieved.

Information accumulator 6 also serves as a database device of a server in a network which realizes a search engine, for example. Specifically, information accumulator 6 accumulates cache data of Web pages browsed by the user (data of saved contents of Web pages produced when the search engine generates the results of the search for the Web pages) as information to be retrieved. Furthermore, information accumulator 6 also serves as a database device of a WWW server, for example. Specifically, information accumulator 6 accumulates information of Web pages and various files held in the WWW server (including files and images in data formats other than HTML) as information to be retrieved.

Input unit 7 comprises an external device, e.g., an input device such as a keyboard, a mouse, or a touch panel with which the user can input commands to a computer. Input unit 7 may comprise a logical input unit for realizing an action on a GUI (Graphical User Interface) for file retrieval, an action on a CUI (Character User Interface), and retrieval keyword entry and clicking on a Web browser. In this case, the information managing system displays GUI, CUI, and browser display screens on the display unit, and enters various items of information from an input unit such as a keyboard and a mouse according to user's actions.

Output unit 8 is an external unit which comprises a display unit, for example, for displaying responses of the computer. The output unit 8 may be a logical output unit such as an interface for displaying information based on a GUI, a CUI, and a Web browser on a display unit.

Elements which server as nodes in the information relevance space may be, for example, files (a text file, a word processor software file, an image file, and a graphic generating file) that are used by the user. Elements which server as nodes may also be items of information of Web pages which have been browsed in the past by the user. Elements which server as nodes may further be service programs provided by Web services and pointers to the service programs. The information managing system may place a past information relevance space as a node in another information relevance space.

Nodes to be searched for have predetermined parameters. Parameters included in each node will be described below. Each node may hold all the parameters, or may select and hold some parameters, or may hold entirely different parameters.

Each node includes a parameter about time (also referred to as "time parameter"). For example, each node includes, as a time parameter, time information representing the time when an action is made on the node. For example, if a node is a file, then the node records the time when the file is accessed (updated and browsed). A node may record a time parameter as well as a parameter indicative of the user who made an action on the node at the time represented by the time parameter.

Each node also includes a parameter about the user (also referred to as "user parameter"). For example, each node includes, as a user parameter, user information (e.g., a user ID) indicative of the user who made an action on the node. For example, if a node is a file, then the node records information of the user who accessed the file. In this case, for example, the node records a user parameter "User A: four times, User B: once". A node may record not only a user parameter representing the number of actions made, but also a user parameter representing more detailed information, such as "User A: browsed once, updated three times, User B: browsed once".

Each node also includes a parameter indicative of relevance to another node (also referred to as "relevance parameter"). For example, each node includes, as a relevance parameter, a value representing the strength of a relationship to another node. For example, each of a node as a file and a node as another file includes a relevance parameter representing an increased relevance value when both files are edited or browsed at the same time (e.g., in a certain period). For example, a file A and a file B are browsed by a certain user in a certain period. In this case, the node of the file A records "File B: 1" as a relevance parameter. If a file C and the file A are subsequently browsed or edited at the same time, the node of the file A records "File B: 1, File C: 1" as a relevance parameter. If the file B and the file A are subsequently browsed or edited at the same time, the node of the file A records "File B: 2, File C: 1" as a relevance parameter.

Each node may include, as a parameter held by a user node, a parameter representative of an action history and a working history of the user. In this case, each node may record, in combination with time, information and a reference history of files (notes) edited or browsed by the user. Each node may also include meta information representative of an affiliation or a group. In this case, each node may hold, as a parameter, meta information representative of a group to which the user belongs. Each node may include a parameter indicative of the role of the user. In this case, the user has a node for each role of the user, and each node holds a parameter for each role. A parameter of each role is used in the calculation of an information relevance space. In some cases, a value representing the combination of all parameters indicative of a plurality of roles of one user may be used in the calculation of an information relevance space.

Each node may include an edited history and an accessed history as a parameter representative of information of an object to be retrieved. In this case, each node may include history information and time information about actions made on the node. Each node may include a parameter representative of the frequency at which editing and access are made. In this case, each node may include user information about a user who made an action on the node and a parameter for access control. Each node may include access control information (information as to whether access is to be permitted for each user or group) and time information representing the time when an action is made on the node.

These parameters are stored in parameter storage 22. Parameter setting unit 21 performs a function to update a parameter of a node according to an action made by the user.

A specific example in which generator 1 generates an information relevance space by way of mapping will be described below. For generating an information relevance space, generator 1 may employ mapping processes described below, either singly or in combination. For example, if a document file such as an office document file is used as a node, then generator 1 generates an information relevance space according to a certain process. If a Web page to be browsed is used as a node, then generator 1 generates an information relevance space according to a process different from the process used for the document file.

A process according to which generator 1 maps information of an object to be retrieved and a user onto a mapping space, and an image converting process (an information relevance space generating process) will be described in specific detail below. Specifically, a process according to which generator 1 generates an information relevance space using parameters held by each node will be described below. Parameters required for calculations are stored in parameter storage 22. As an example, an information relevance space generating process for generating an information relevance space around the node of a user A will be described below.

A weight relative to time (also referred as a time weighting coefficient) is denoted by $w_t$, and a weight relative to a user (also referred to as a user weighting coefficient) is denoted by $w_u$. Present time is denoted by t, and a final browsing time (determined from the parameter relative to time (time parameter) referred to above) of the node (the node of the user A) is denoted by $t_n$. The frequency of actions (determined from the parameter relative to the user (user parameter) referred to above) made on the node by the user A is denoted by $u_{na}$. In this case, generator 1 determines a vector $v_n$ of each node around the user A according to the equation (1) shown below. A process of determining the vector $v_n$ is referred to as mapping of each node onto the information relevance space of the user A.

$$v_n = \begin{bmatrix} (t - t_n) \times w_t \\ \dfrac{1}{u_{na}} \times w_u \end{bmatrix} \quad (1)$$

The vector $v_n$ serves as a vector representing the position of the node in the information relevance space around the user A. Initial values of the weights $w_t$, $w_u$ may be set such that either one of the axes (in this example, the relevance of the time and the user) will not have too a strong effect. As the time weighting coefficient $w_t$ and the user weighting coefficient $w_u$ have greater numerical values, their parameters have greater effects. The effect of any of the parameters can intentionally be increased by changing the values of the time weighting coefficient $w_t$ and the user weighting coefficient $w_u$. Actually, the values of the time weighting coefficient $w_t$ and the user weighting coefficient $w_u$ can be changed by an action of the user.

An absolute value $v_n$ which represents the length of the vector $v_n$ represents the distance in the information relevance space between each node and the user A. Generator 1 determines the absolute value $v_n$ which represents the distance in the information relevance space according to the following equation (2):

$$|v_n| = \sqrt{((t - t_n) \times W_t)^2 + \left(\dfrac{1}{u_{na}} \times w_u\right)^2} \quad (2)$$

Generator 1 specifies a node whose distance determined according to the equation (2) is equal to or smaller than a predetermined threshold value, as relevance information of the user A. The threshold value for specifying relevance information based on the distance may be adjusted by the user, i.e., may be changed according to an action of the user.

An information relevance space generating process for generating an information relevance space around the node of a user B will be described below.

A weight relative to time (also referred as a time weighting coefficient) is denoted by $w_t$, and a weight relative to a node (also referred to as a node weighting coefficient) is denoted by $w_R$. A final updating time (or a final browsing time, determined from the parameter relative to time (time parameter) referred to above) of the file B is denoted by $t_b$, and a final browsing time (determined from the parameter relative to time (time parameter) referred to above) of the node is denoted by $t_n$. The frequency of relevance (determined from the parameter (relevance parameter) indicative of the relevance to another node) of the node to the file B is denoted by $R_b$. In this case, generator 1 determines a vector $v_{nb}$ of each node around the user B according to the equation (3) shown below. A process of determining the vector $v_{nb}$ is referred to as mapping of each node onto the information relevance space of the user B.

$$v_{nb} = \begin{bmatrix} (t_b - t_n) \times w_t \\ \dfrac{1}{R_b} \times w_R \end{bmatrix} \quad (3)$$

The vector $v_{nb}$ serves as a vector representing the position of the node in the information relevance space around the user B. Initial values of the weights $w_t$, $w_R$ may be set such that either one of the axes (in this example, the relevance of the time and the user) will not have too a strong effect. As the time weighting coefficient $w_t$ and the node weighting coefficient $w_R$ have greater numerical values, their parameters have greater effects. The effect of any of the parameters can intentionally be increased by changing the values of the time weighting coefficient $w_t$ and the node weighting coefficient $w_R$. Actually, the values of the time weighting coefficient $w_t$ and the node weighting coefficient $w_R$ can be changed by an action of the user.

An absolute value $v_{nb}$ which represents the length of the vector $v_{nb}$ represents the distance in the information relevance space between each node and the user B. Generator 1 determines the absolute value $v_{nb}$ which represents the distance in the information relevance space according to the following equation (4):

$$|vnb| = \sqrt{((t_b - t_n) \times w_t)^2 + \left(\dfrac{1}{R_b} \times w_R\right)^2} \quad (4)$$

Generator 1 specifies a node whose distance determined according to the equation (4) is equal to or smaller than a predetermined threshold value, as relevance information of the user B. The threshold value for specifying relevance information based on the distance may be adjusted by the user, i.e., may be changed according to an action of the user.

In the present example, an information relevance space is generated according to the equations (3), (4) on the assumption that a node is a file. However, an information relevance space may be generated by any of other processes. For example, an action time (which can be calculated from a parameter about time (a time parameter)) representing the time when another user makes an action on a file B is denoted by $t_b$, and an action frequency (which can be calculated from a parameter about a user (a user parameter)) representing the frequency at which another user makes an action on the file B is denoted by $R_b$. Generator 1 can then calculate a distance in the information relevance space according to an equation that is similar to the equation (4) except that $w_R$ is changed to $w_u$.

If a file B is present within a given distance in the information relevance space of the user A, then generator 1 may specify another node (a file C) that is present closely in the information relevance space around the file B as relevant information of the original A, and may present the relevant information of the original A. In this case, generator 1 can determine the distance from the user A to the other node (the file C) according to the equation (5):

$$|v_n| + |v_{nb}| \tag{5}$$

If the distance determined according to the equation (5) is equal to or smaller than a predetermined threshold value, then generator 1 may specify its node (the file C) as relevant information. Alternatively, generator 1 can calculate an information relevance space of the file C, and specify and present a file that is present closely in the information relevance space of the file C.

According to the above process of calculating information relevance spaces, it appears that there may be a need for the generation of relevance spaces in many dimensions, i.e., the calculation of an information relevance space of another node near the file C and the calculation of an information relevance space of still another node near the file C. In this case, generator 1 may calculate all related information relevance spaces or calculate information relevance spaces in a limited range, e.g., may calculate information relevance spaces down to a grandchild level (in this example, the file C corresponds to a grandchild).

A specific example in which generator 3 generates screen information of a display screen will be described below. Generator 3 extracts information from an information relevance space and generates screen information of a display screen according to a procedure described below. Generator 3 also extracts information from an information relevance space and processes screen information of an existing display screen.

Figure 6:
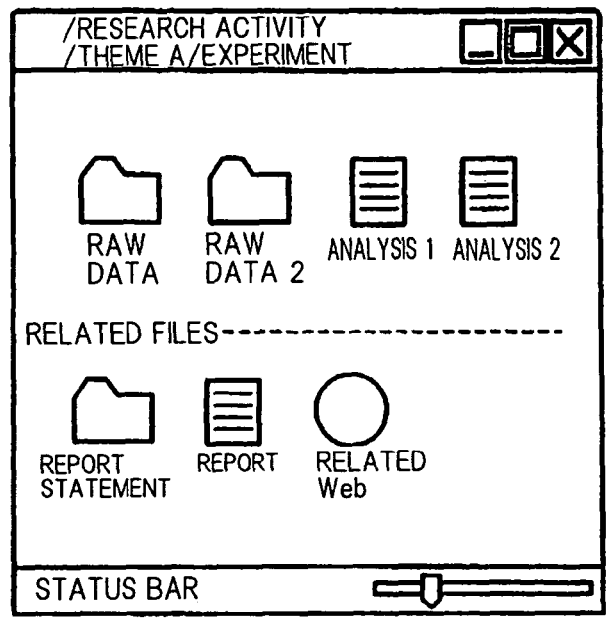
FIG. 6 is a view showing by way of example a display screen based on screen information generated by a display screen generator of the information managing system shown in FIG. 5.

FIG. 6 shows by way of example a display screen based on screen information generated (or processed) by generator 3. In the example shown in FIG. 6, output unit 8 displays, as relevant files, information of nodes near (e.g., within a given distance in a mappings space) nodes of a certain directory (or nodes of files stored in a directory). In the present example, moreover, nodes of "report statement directory", "report", and "relevant Web" are present near (within a certain distance) nodes indicative of a directory "/research activity/theme A/experiment/" (or nodes of files stored in the directory). Output unit 8 displays a display screen including those nodes.

Figure 7:
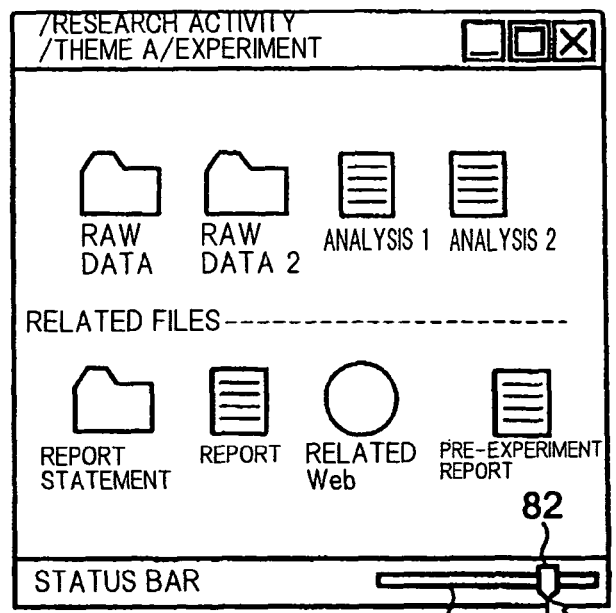
FIG. 7 is a view showing by way of example a display screen based on screen information adjusted by a field-of-vision manipulator of the information managing system shown in FIG. 5.

FIG. 7 shows by way of example a display screen based on screen information adjusted by field-of-vision manipulator 4. The display screen shown in FIG. 7 corresponds to the display screen shown in FIG. 6 after its field of vision is manipulated by the user. In the example shown in FIG. 7, slider 81 in a lower portion of the window corresponds to the user interface realized by field-of-vision manipulator 4.

According to the present embodiment, the user horizontally slides adjustment button 82 of slider 81 with a mouse or the like to change the field of vision of the display screen. When slider 81 is spread horizontally, i.e., when adjustment button 82 of slider 81 is moved to the right, a distance handled as near nodes (referred to as a field of vision) is increased. According to the present embodiment, therefore, generator 3 generates screen information of a display screen including slider (field-of-vision adjuster) 81 for changing the field of vision in the information relevance space for displaying information of objects to be retrieved. Field-of-vision manipulator 4 changes the field of vision in the information relevance space for displaying information of objects to be retrieved, according to a change command entered from slider 81 in the display screen by the user.

Figure 8:
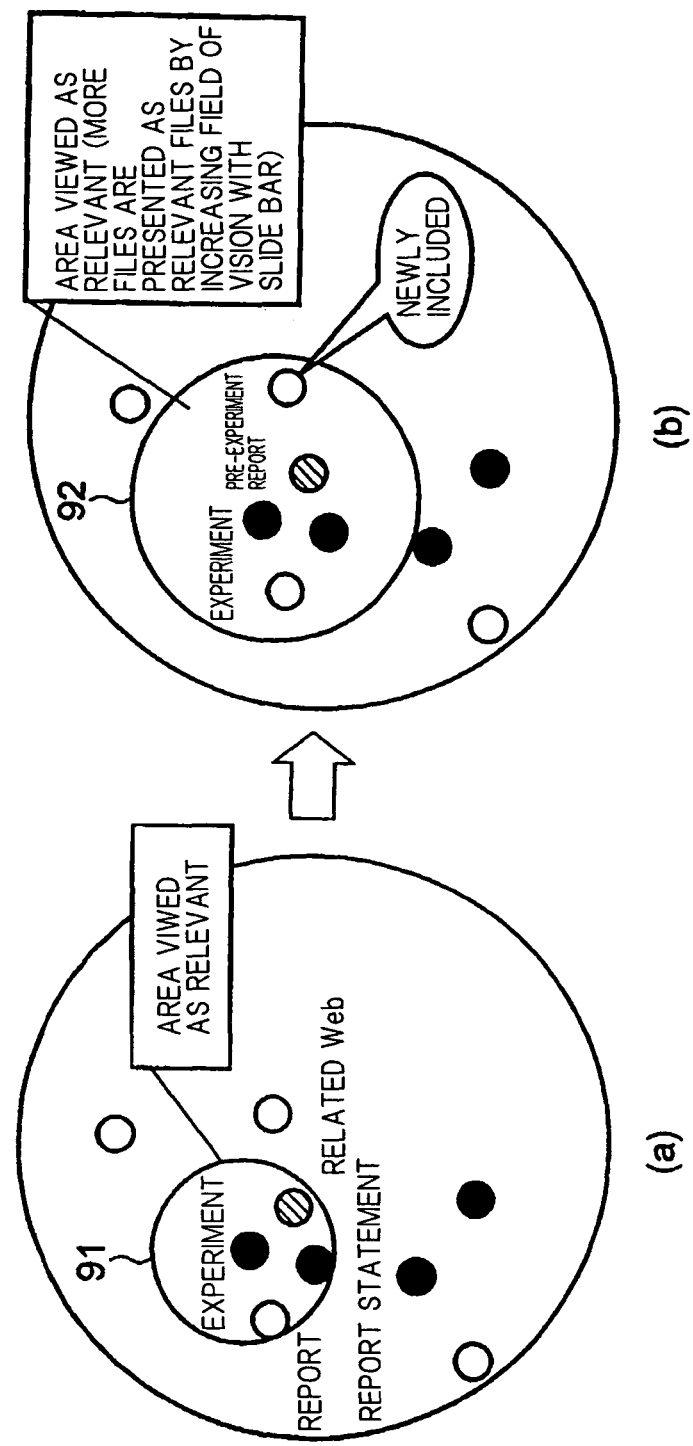
FIGS. 8(a) and 8(b) are views showing the manner in which a field of vision of a display screen is adjusted.

Before the field of vision is changed, i.e., with the display screen shown in FIG. 6, a display screen including nodes "experiment", "report", "report statement", and "relevant Web" in field 91 of vision is displayed as shown in FIG. 8(*a*). After the field of vision is widened, as shown in FIG. 8(*b*), a node "pre-experiment report" is newly handled as a near node, and included in a field 92 of vision. The node "pre-experiment report" is displayed as a relevant file. The slide bar (slider 81) shown in FIG. 7 is an example of field-of-vision manipulator 4.

In the present embodiment, it is assumed that a field of vision is present in a concentric circle around a node in the mapping space (or in a sphere if the mapping space is three-dimensional), and a node in the circle (or in the sphere) is handled as a near node. However, a field of vision may be sectorial in shape with the node at the vertex. In this case, the sectorial range as viewed in a given direction in the mapping space may be handled as a near range, and the shape of the field of vision is no object.

A process of changing the field of vision will be described below. In the present embodiment, when the user retrieve a directory, the information managing system presents relevant information with respect to the directory to be retrieved thereby assisting the user in retrieving the directory.

For example, when the user accesses the directory "/research activity/theme A/experiment/", the information managing system displays the display screen shown in FIG. 6. The directory "/research activity/theme A/experiment/" includes directories "raw data", "raw data 2", and files "analysis 1", "analysis 2". Generator 1 generates an information relevance space of the directory "/research activity/theme A/experiment/". Generator 3 generates screen information of a display screen for presenting nodes ("report statement directory", "report", and "relevant Web" in this example) whose distances are equal to or smaller than a certain value (hereinafter referred to as "threshold value x") in the information relevance space, as relevance files. Output unit 8 displays the display screen shown in FIG. 6 based on the generated screen information.

The user can change the threshold value x with slide bar 81. Based on a user's action, the display screen shown in FIG. 7 whose field of vision has been changed using slide bar 81 is displayed. If the threshold value is changed to a greater value with slide bar 81, then the node "pre-experiment report" that is newly included in the node distance x is newly displayed as a relevant file.

Though the information relevance space around the directory "/research activity/theme A/experiment/" is generated in the present example, an information relevance space around the user who attempts to retrieve files may be generated. In this case, nodes whose distances from the directory node "/research activity/theme A/experiment/" in the information relevance space are equal to or smaller than the threshold value may be presented as relevant information. Generator 1 can determine the distance between the nodes by calculating the distance between two vectors.

2nd Embodiment

Another specific example of operation of field-of-vision manipulator 4 and another specific example in which generator 3 generates screen information of a display screen will be described below. These specific examples may be combined freely, and specific examples of field-of-vision manipulator 4 and generator 3 may be combined with each other.

A GUI file searching tool exemplified by the explorer of Microsoft Windows (registered trademark) can be another specific example of the user interface realized by field-of-vision manipulator 4. In this case, the user operates input unit 7 using the file searching tool to open a directory or a file and apply a pointer to an icon to select the icon. When the user makes these actions, field-of-vision manipulator 4 transfers an instruction to generator 3. Generator 3 regenerates screen information of a display screen in order to include a node near a file selected by the user in the information relevance space as relevant information. Output unit 8 displays a display screen based on the new screen information.

A retrieval screen such as of a Web search engine or the like can also be still another specific example of the user interface realized by field-of-vision manipulator 4. In this case, the user operates input unit 7 to enter a retrieval keyword in the retrieval screen. When the retrieval keyword is entered, generator 3 calculates the position in the mapping space which corresponds to the entered keyword, and determines a node that is present near the calculated position as a retrieval result. Generator 3 generates screen information of a display screen for displaying a determined retrieval result. Output unit 8 displays a display screen based on the new screen information.

Figure 9:
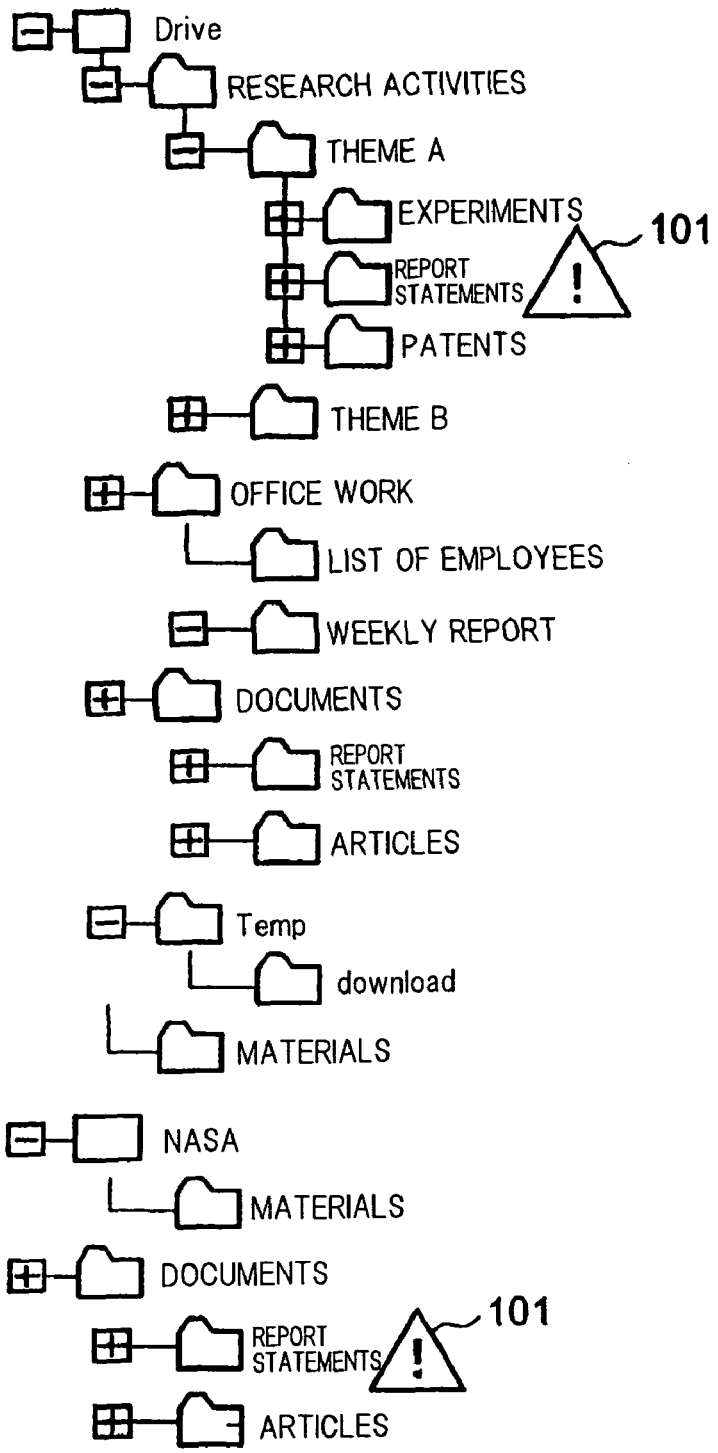
FIG. 9 is a view showing a display screen displaying highlighted directories and files including keywords.

The display screen displayed by output unit 8 based on the retrieval result may be a screen including a ranked list such as an output result from a general Web search engine. Furthermore, as shown in FIG. 9, output unit 8 may display a display screen in which display marks 101 for highlighting directories and files including keywords are added to an ordinary screen. In this case, output unit 8 may highlight directories and files by changing icons and colors of the directories and files or changing shades of characters representing the directories and files. Specifically, output unit 8 displays highlighted nodes whose distances in the information relevance space are small.

An interface for directly entering a node provided at the center of the field of vision may be yet another specific example of the user interface realized by field-of-vision manipulator 4. For example, when the user logs in on an operating system (OS), the user operates input unit 7 to enter its own user name. Field-of-vision manipulator 4 may handle the entered user name as the node at the center of the field of vision. In this case, generator 3 generates screen information of a display screen including, as relevant information, a node that is present near the node of the user name in the mapping space.

Moreover, an interface for separately entering a node provided at the center of the field of vision may be yet still another specific example of the user interface realized by field-of-vision manipulator 4. Alternatively, an interface for selecting other user names and files may be a still further specific example of the user interface realized by field-of-vision manipulator 4. In this case, field-of-vision manipulator 4 transfers a user name and a file name entered by the user to generator 3. Generator 3 then regenerates screen information of a display screen based on the user name and the file name from field-of-vision manipulator 4.

Figure 10:
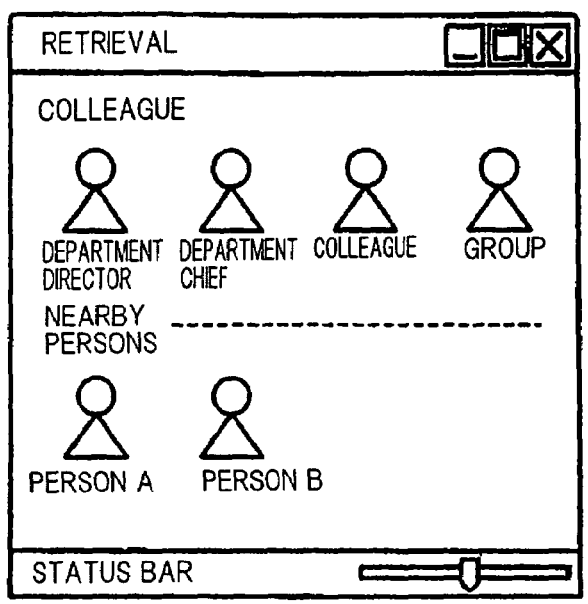
FIG. 10 is a view showing by way of example a display screen displaying selected users.

FIG. 10 shows by way of example a display screen displaying selected users. In the example shown in FIG. 10, generator 3 extracts, as relevant information, colleagues linked to the user having the entered user name, a group to which the colleagues belong, and persons "A", "B" whose distances to the user are small in the mapping space, and generates screen information of a display screen from the extracted relevant information. Output unit 8 displays the display screen shown in FIG. 10 based on the screen information generated by generator 3.

A user interface may be used as an example of field-of-vision manipulator 4. The user can retrieve information using the point of view of another user. For example, the user can select another user from the window (display screen) shown in FIG. 10, and can view information that is present near another user node in the information relevance space. The display screen shown in FIG. 10 displays explicitly related users (e.g., another user and a supervisor which belong to the same group without calculating an information relevance space) and users (the persons "A", "B" in this example) that are present within a certain distance (smaller than a threshold value) in the information relevance space of the user itself. The user can change the threshold value for the distance using the slider shown at the lower portion of the window.

If another user is selected from the window shown in FIG. 10, generator 1 regenerates an information relevance space around the selected other user according to the process described above. Generator 3 generates screen information of a display screen for presenting nodes included in a certain value (in a predetermined distance) from the selected other user, based on the regenerated information relevance space. Based on the screen information, output unit 8 displays the display screen including the nodes within the predetermined distance from the selected other user.

According to the present embodiment, therefore, generator 3 generates screen information of a display screen including icons (identifying information) representative of respective nodes (user nodes in this example). When the user selects and enters an icon from the display screen, field-of-vision manipulator 4 selects the node corresponding to the selected and entered icon as a point of view in the information relevance space for displaying information to be retrieved.

Field-of-vision manipulator 4 may employ information other than the information directly entered by the user. For example, field-of-vision manipulator 4 employs information as to date or time. In this case, generator 3 receives information as to date or time from field-of-vision manipulator 4, and also receives information as to a past information relevance space corresponding to the user from generator 1. Generator 3 then generates screen information of a display screen including, as relevant information, a node that is present near the user node in the same time zone or the same period (e.g. the beginning of a month), for example. For example, generator 3 may generate screen information of a display screen including, as relevant information, a file edited in the same period from a log recorded in the mapping space.

Figure 11:
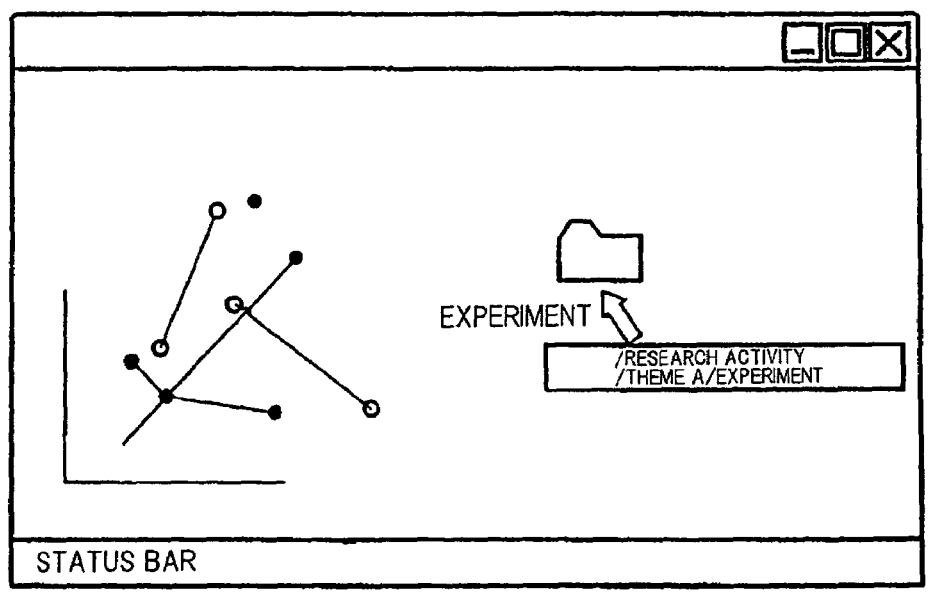
FIG. 11 is a view showing by way of example a display screen including an information relevance space.

As shown in FIG. 11, generator 3 may generate screen information of a display screen for displaying the information relevance space itself which is generated by generator 1, and present (output) the generated screen information to output unit 8. Based on the screen information generated by generator 3, output unit 8 may display the display screen including the information relevance space shown in FIG. 11.

Figure 12:
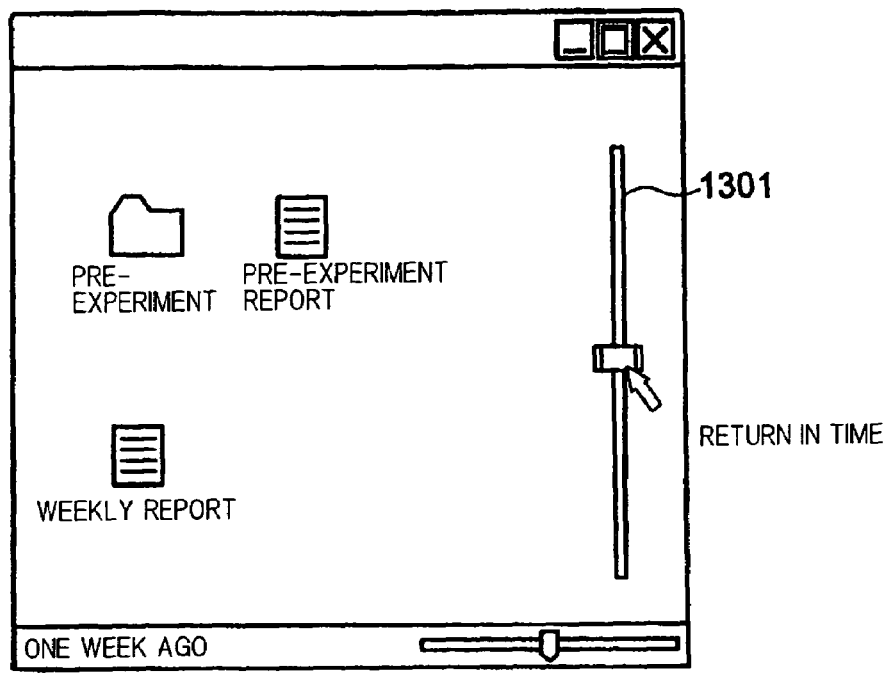
FIG. 12 is a view showing by way of example a display screen for the user to change an information relevance space by changing time (before the change)
Figure 13:
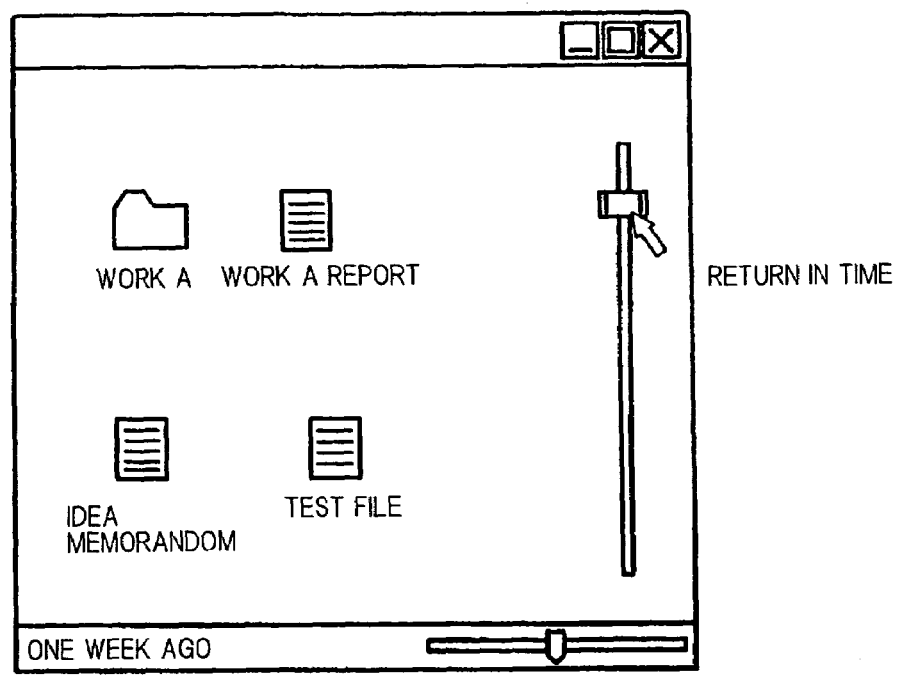
FIG. 13 is a view showing by way of example a display screen for the user to change an information relevance space by changing time (after the change)

The user is able to dynamically vary the information relevance space by operating input unit 7. A process of dynamically varying the information relevance space by changing time will be described below. FIGS. 12 and 13 show by way of example display screens in which the user can change the information relevance space by changing time.

FIG. 12 shows a display screen which is displayed by extracting information that is highly relevant to a certain user (e.g., a user A) from an information relevance space around the user A. As shown in FIG. 12, the display screen displayed by output unit 8 includes slide bar 1301 for changing time. In this case, the user operates, using a mouse or the like, slide bar 1301 included in the right portion of the display screen to return to a past time. According to the user's action to change time, the information managing system displays a display screen for presenting information that has been highly relevant in the past, as shown in FIG. 13.

There are available two processes, described below, for performing an operation sequence to display information by changing time. The first process is based on accessing a past information relevance space. The second process is based on varying a parameter.

The process (process 1) based on accessing a past information relevance space will first be described below. The information managing system periodically generates and records an information relevance space around the user A. When the user operates slide bar 1301 in the right portion of the display screen, the information managing system calls an information relevance space generated in the past. Based on the information relevance space corresponding to the time selected by the user, the information managing system presents (displays) a display screen including the information that was highly relevant at the time corresponding to the time selected by the user. According to the process 1, since it is not necessary to calculate an information relevance space in real time, it is easy to present highly relevant information.

The process (process 2) based on varying a parameter will be described below. As described above in the first embodiment, generator 1 calculates the information relevance space of the user A according to the equations (1), (2). In the first embodiment, generator 1 determines an information relevance space with the value of t in the equations (1), (2) being representative of the present time. According to the present embodiment, when the user operates slide bar 1301 in the right portion of the display screen, generator 1 returns the value of t to a certain time in the part and calculates an information relevance space.

For example, if only the process 1 is employed, then it is only possible to present relevant information at a time in the past as viewed from the time in the past. According to the process 2, however, it is possible to present relevant information taking into account a behavior from the time in the past to the present time. According to the process 2, for example, the information managing system can display a display screen reflecting a file that was used immediately after a time in the past that is specified by the slide bar. The slide bars shown in FIGS. 12 and 13 are an example of manipulator 2.

For generating an information relevance space, the user can also determine which of the parameters described in the first embodiment is to be stressed in calculating the information relevance space. Specifically, for calculating an information relevance space, the user operates input unit 7 to instruct a change in parameters $w_t$, $w_u$, $w_R$ at the time of the calculation of the equations (1) through (4). As the values of these parameters are greater, the effect of the parameters is greater.

Figure 14:
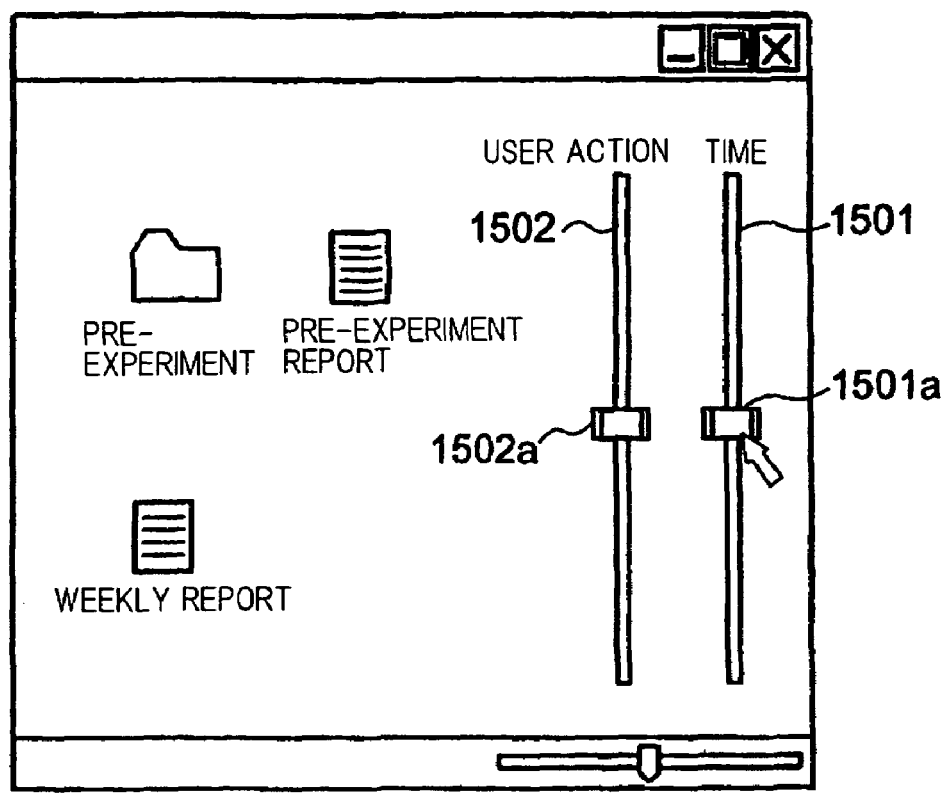
FIG. 14 is a view showing by way of example a display screen including a user interface for setting parameters.

FIG. 14 shows by way of example a display screen including a user interface for setting parameters to be stressed. As shown in FIG. 14, the user operates vertical sliders in the right portion of the display screen to instruct a change in parameters $w_t$, $w_u$, $w_R$. The display screen shown in FIG. 14 serves to present relevant information around the user A. Generator 1 calculates an information relevance space according to the equations (1), (2) given in the first embodiment. Therefore, generator 1 calculates an information relevance space using two parameters $w_t$, $w_u$ as weighting coefficients.

In FIG. 14, the display screen includes slide bar 1501 for instructing a change in a time parameter and slide bar 1502 for instructing a change in a user parameter. Specifically, slide bar 1501 for the time is associated with parameter $w_t$, and slide bar 1502 for the user action is associated with parameter $w_u$. When the user operates slide bars 1501, 1502, the weight values of parameters $w_t$, $w_u$ are varied. Based on the varied values of parameters $w_t$, $w_u$, generator 1 recalculates an information relevance space. If the user lowers slider (adjustment button) 1502a on slide bar 1502 for the user action, i.e., if the user reduces parameter $w_u$, and if the user raises slider 1501a on slide bar 1501 for the time, i.e., if the user increases parameter $w_t$, then a recently used file is placed in a near position in the information relevance space. The slide bars shown in FIG. 14 are also an example of manipulator 2.

According to the present embodiment, generator 3 generates screen information of a display screen including slide bars (weight adjusters) 1501, 1502 for changing the weights of the nodes. When manipulator 2 is supplied with instructions to change the weights of the nodes from slide bars 1501, 1502 in the display screen, manipulator 2 instructs generator 1 to change the information relevance space.

The user can also copy, to a certain object (e.g., a file node), a parameter of another object. For example, for generating a new node, the information managing system may set the initial value of the parameter of a node described in the first embodiment to the value of a node of a parent directory. This function is performed by parameter setting unit 21.

It is assumed that when an information relevance space is directly seen by the user, the user wants to place a node A near another node B. In this case, based on an action of the user, the information managing system changes the parameter of the node A to the value of the node B, thereby changing the position of the node A to the position of the node B. At this time, a user interface used by the user to place the node A near the node B is an example of an interface for giving an instruction to parameter setting unit 21.

According to the present embodiment, the information managing system has a parameter copying unit (specifically, implemented by the CPU of the information processing apparatus which operates according to a program) for copying, to a certain object, a parameter of another object. Generator 1 generates an information relevance space based on the parameter copied by parameter copying unit.

The information managing system may have a setting information specifying unit (specifically, implemented by the CPU of the information processing apparatus which operates according to a program) for specifying a certain object according to a policy. The parameter copying unit may copy, to a certain object, a parameter of an object specified according to a policy when an information relevance space is generated.

3rd Embodiment

An information managing system according to a third embodiment will be described below. The information managing system according to the third embodiment is a specific example of the information managing system according to the second embodiment. In the third embodiment, the charge information stored in charge information storage unit 9 affects the process performed by the user to change the process of manipulating the field of vision and the process performed by generator 1 to generate an information relevance space. For example, when a trial-version service is provided, the process to change the process of manipulating the field of vision may be changed and the process to generate an information relevance space may be performed based on the charge information. For example, unless the user pays for a predetermined fee, the information managing system periodically reset (erase) the information relevance space so that the information relevance space that has been generated by the user itself will not be used for a long period of time. Furthermore, on the condition that charge information storage unit 9 holds virtual money, for example, the information managing system may perform a control process for permitting detailed settings as to whether information for manipulating files and information itself are to be released to other persons.

According to the present embodiment, generator 3 limits functions to be presented to the user and generates screen information of a display screen based on the charge information stored in charge information storage unit 9. Manipulator 2 (or field-of-vision manipulator 4) determines whether a function is valid or invalid based on the charge information stored in charge information storage unit 9. Manipulator 2 (or field-of-vision manipulator 4) then performs a control process for inhibiting the user from using the corresponding function, if necessary, based on the determined result as to whether the function is valid or invalid.

Unless the user uses virtual money, the information managing system may perform a control process of inhibiting the user from using a past information relevance space or from using a certain function.

In the present embodiment, the charge information may be based on not only money in actual use (e.g., yen or dollars) but also virtual money. If the charge information is based on virtual money, then the information managing system may allow the user to receive another charged service by using virtual money obtained by providing information to other persons.

In the present embodiment, the information managing system can hold a scheme for the user to obtain a payment for presenting its own point of view to other persons. The payment may be made by money in actual use or virtual money. For example, it is assumed that the user A releases an information relevance space using its own node as a point of view, for a payment. In this case, an ACL (Access Control List) parameter of the nose of the user A holds information representing a request for a payment for the node of the user A used as a point of view. Other users make the payment to the user A when they use the information relevance space using the node of the user A as the point of view. The above ACL may be added to not only the node of the user, but also the node of a file or the like. In this case, the payment is made to a user (owner or the like) determined by the file (specified by the ACL added to the file).

According to the present embodiment, the information managing system has a point-of-view adder (specifically, implemented by the CPU of the information processing apparatus which operates according to a program) for adding, to an ACL parameter, point-of-view information representative of a point of view in an information relevance space for displaying information to be retrieved. Field-of-vision manipulator 4 selects a point of view in an information relevance space for displaying information to be retrieved, based on the point-of-view information added to the ACL parameter.

According to the present embodiment, the information managing system has a point-of-view changer (specifically, implemented by the CPU of the information processing apparatus which operates according to a program) for changing point-of-view information added to an ACL parameter. Field-of-vision manipulator 4 changes point-of-view information added to an ACL parameter based on charge information stored in charge information storage unit 9, on the condition that a predetermined fee has been paid.

4th Embodiment

An information managing system according to a fourth embodiment will be described below. According to the fourth embodiment, the information managing system according to the second embodiment is applied to providing various services such as advertisement services or the like. For example, for displaying a display screen of received information, the information managing system provides an advertisement service by allowing any desired nodes to appear easily in an information relevance space of another person. The nodes in the information relevance space are not limited to files and items of information. The information managing system may provide an advertisement service for guidance to a service program by displaying a display screen having a node of the service program. Therefore, a charged service such as a program guidance service or the like can be provided. It is also possible to provide an advertisement service for displaying a node for guiding a person to a Web page near information related to another person, or for allowing a node for guiding a person to a Web page to appear in a display screen when another person performs a related operation.

The information managing system may perform a control process for stopping the above advertisement service when the user fails to pay a fee. Furthermore, the information managing system may perform a control process for allowing the user to receive virtual money when the user positively accepts an advertisement service.

5th Embodiment

An information managing system according to a fifth embodiment will be described below. In the present embodiment, the information managing system performs a control process for allowing the user to receive virtual money when the user releases a node to another person or releases the movement of a node to another person. The information managing system also performs a control process for allowing the user to receive virtual money when another person refers to or uses information as a result of the release of a useful node to the other person.

Figure 15:
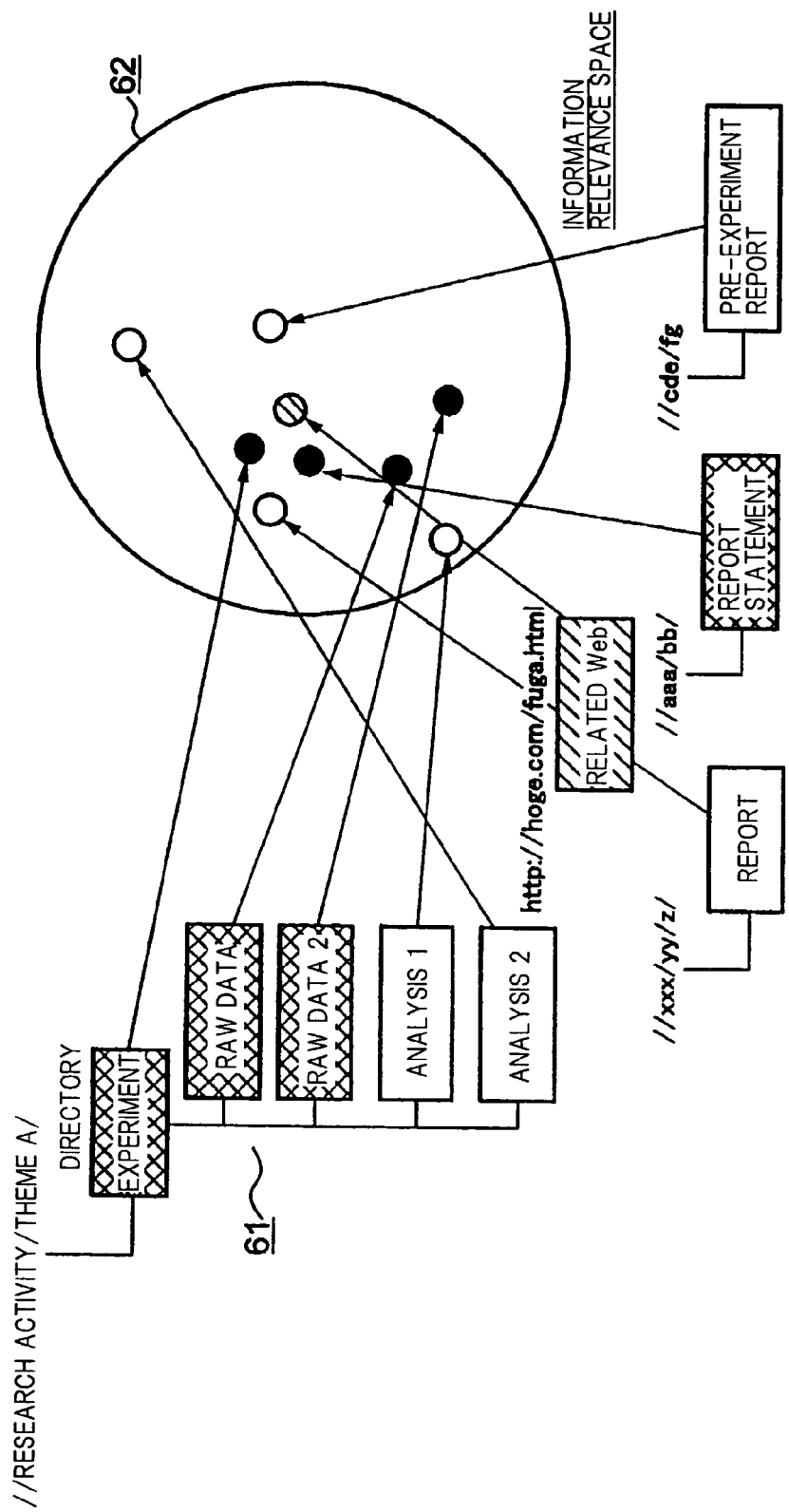
FIG. 15 is a diagram showing by way of example an information relevance space generated by the information relevance space generator.

FIG. 15 shows by way of example an information relevance space generated by generator 1. According to the present embodiment, as shown in FIG. 15, information accumulator 6 accumulates therein a group of information including a directory "experiment", raw data, and analytic data ("analysis 1", "analysis 2"). Generator 1 generates information relevance space 62 using a mapping space as shown in FIG. 15, based on the group of information accumulated in information accumulator 6.

A specific example of operation of manipulator 2 will be described below. Manipulator 2 monitors command actions of the user (file manipulation and working). If a given condition is satisfied, then manipulator 2 instructs generator 1 to move each node in the mapping space based on a file manipulation by the user. Specifically, if the user makes an action to edit a file, then manipulator 2 instructs generator 1 to move each node in the mapping space in order to reduce the distance between the file node of the file to be edited and the user node. According to the instruction of manipulator 2, generator 1 weights the file node and the user node to move them toward each other by a predetermined distance, and regenerates an information relevance space.

6th Embodiment

An information managing system according to a sixth embodiment will be described below. In the present embodiment, the information managing system has a function (privacy option) to determine whether a node is to be displayed in a display screen of another user or not in accordance with user manipulating using input unit 7.

According to the present embodiment, a privacy option is assigned to each node, and it is determined whether or not information is to be revealed to other users or users in another group (whether the release of information is permitted or not). If a privacy option is set not to release information in a node, then when the node is accessed by another user, generator 3 does not generate screen information of a display screen including the information not to be released. Information of the privacy option (setting information) may be recorded in the memory of generator 1 or the information accumulator 6.

In the present embodiment, it is possible to provide a setting as to whether information about an action of the user (the movement of a node based on an action of the user) is to be released to another user or not. If a setting is made as to whether such information is not to be released, then the information managing system performs a control process for holding the effect of a user's action within a closed information relevance space corresponding to the user, and for preventing the user's action from affecting an information relevance space of another user. The information managing system according to the sixth embodiment corresponds to a specific example of the information managing system according to the first embodiment.

A specific example of a privacy option will be described below. The user can select, in advance, whether the information relevance space of the user and an action of the user are to be released to another user or not. For example, the function of a privacy action can be performed when each node holds the parameters described in the first embodiment and also a parameter of access control.

For example, it is assumed that a user A gives a user B an access permission and does not give a user C an access permission. According to a setting action of the user, the information managing system holds a value "user B: 1, user C: 0" as an ACL parameter of the user A. In this case, the information managing system performs a control process for allowing the user B to browse the user A in the information relevance space (e.g., the information relevance space of the user A) and also performs a control process for preventing the user C from browsing the user A in the information relevance space (e.g., the information relevance space of the user A). Actually, the information managing system may perform a control process for allowing the node of the user A to calculate an information relevance space with respect to the user whose ACL parameter is "1". The ACL parameter is stored in parameter storage 22.

7th Embodiment

An information managing system according to a seventh embodiment will be described below. In the present embodiment, generator 1 generates a document vector of each file stored in information accumulator 6 based on a vector space model. Generator 1 may place a document vector of each file into a lower dimension using latent semantic indexing or the like. Using the calculated document vector as a vector indicative of a location in the mapping space, generator 1 places the node of the file in the mapping space, and generates an information relevance space.

8th Embodiment

An information managing system according to an eighth embodiment will be described below. In the present embodiment, generator 1 generates an information relevance space using metal information such as a file or the like. Generator 1 handles meta information of each file stored in information accumulator 6 to be mapped onto the mapping space, as an axis of the mapping space. For example, generator 1 regards an axis of the mapping space as representing time, acquires a final file updating time from the metal information of each file, and uses the final file updating time as an element for mapping the file onto the mapping space. Then, generator 1 places each file in the mapping space according to the final file updating time.

A list of users converted into numerical values (e.g., a list of users arranged such that more relevant users are positioned more closely to each other and converted into numerical values) is generated, and users such as generators or owners of respective files may be used as representing an axis of the mapping space. In this case, generator 1 places the users in the mapping space according to the numerical values of the users. When the axis of the mapping space is changed from the axis representing time to the axis representing the numerical values of the users, the information relevance space is corrected, and the result presented to the user (field of vision) is changed.

Generator 1 may generate an information relevance space by combining the process, described above, for analyzing information of a file or the like and mapping the file onto the mapping space, with the process of using meta information. For example, generator 1 may set the semantic vector described above as a two-dimensional vector and generate an information relevance space with the process of using an axis of the mapping space as representing time.

9th Embodiment

An information managing system according to a ninth embodiment will be described below. In the present embodiment, when a file or the like is initially generated, generator 1 lets the user determine the position of the generated file in the mapping space and maps the file onto the mapping space. Specifically, when a file needs to be mapped onto the mapping space, the user operates input unit 7 to directly determine the mapping position in the mapping space. For example, a process of presenting a graph indicative of a mapping space to the user and allowing the user to specify the position of a node to be newly mapped is used. In this case, for example, generator 1 controls a display device to display the graph indicative of the mapping space. Then, generator 1 enters information specifying the node position according to a user's action entered from input unit 7.

Furthermore, generator 1 maps a new file near the file which is frequently manipulated by the user, and generates an information relevance space. When a new file is generated by a user's action, generator 1 places a new file near the file which is frequently used by the user who has generated the file (hereinafter referred to as "generating user"), for example, and generates an information relevance space. Furthermore, at the time a new file is generated, for example, generator 1 places a new file near a node that is used at the same time as the new file, and generates an information relevance space. Moreover, generator 1 determines a position which is close to the average position of a plurality of nodes used approximately at the same time as the time when a new file is generated (e.g., within a predetermined time from the time when the new file is generated), places the new file at the determined position, and generates an information relevance space.

Generator 1 may map a new file onto the same position as the position of another user (e.g., a family member or a friend) who is closely related to the generating user, but not the position of the generating user, and generate an information relevance space. Moreover, generator 1 may map the position of the node of the user itself in the same manner as the other user who is closely related to the user is mapped, and generate an information relevance space.

10th Embodiment

An information managing system according to a tenth embodiment will be described below. In the present embodiment, manipulator 2 instructs generator 1 to link the file node of a file that is frequently used by the user and the user node of the user who uses the file. Algorithms for moving nodes linked to each other and nodes that are not linked to each other may be different from each other so that the linked nodes will not easily be moved away from each other. In the first embodiment, the equations used by generator 1 for mapping are different between linked nodes and unlinked nodes. A link information parameter is recorded as the parameter set by parameter setting unit 21.

Manipulator 2 may instruct generator 1 to link files that are referred to or edited by the user at the same time (e.g., in a predetermined period). Alternatively, manipulator 2 may give an instruction to generator 1 to move files toward each other for thereby reducing the distance between the files that are referred to or edited by the user at the same time (e.g., in a predetermined period). Further alternatively, manipulator 2 may give an instruction to generator 1 to move a file that is not used by the user, thereby increasing the distance between the file and the node of the user as the time elapses.

INDUSTRIAL APPLICABILITY

The present invention is applicable to a retrieval system and a retrieval interface for retrieving a file from a storage according to a request from the user. The present invention is also applicable to an information accumulating system and an information managing system such as groupware, a contents management system, etc. for sharing information among a plurality of persons. The present invention is also applicable to an information accumulating system and an information managing system such as a mail client, etc. for processing electronic mails.

While a preferred embodiment of the present invention has been described using specific terms, such description is for illustrative purposes only, and it is to be understood that changes and variations may be made without departing from the spirit or scope of the following claims.

What is claimed is:

1. An information managing system comprising:
a parameter setting unit including a first processor configured to set a parameter representative of one or more user attributes of a user and one or more information attributes of items of information to be retrieved;
an information relevance space generator including said first processor or a second processor configured to generate an information relevance space by placing the items of information to be retrieved onto a mapping space having one or more axes, based on the parameter set by said parameter setting unit,
wherein:
at least one of said one or more information attributes is an attribute other than content of said items of information to be retrieved,
said information relevance space represents information indicative of the relevance and semantic closeness of said items of information and information indicative of the relevance and semantic closeness of users who retrieves and uses said items of information, and
at least a first item and a second item of said items that are not relevant based on contents of said first and second items are determined highly relevant in said information relevance space;
an output controller including at least one of said first and second processor or another processor configured to generate output information for outputting the information to be retrieved based on the information relevance space generated by said information relevance space generator,
wherein said information relevance space generator comprises a weighting unit configured to generate said information relevance space by weighting nodes which are represented respectively by said user and said information to be retrieved; and
an information relevance space manipulator including at least one of said first and second processor or another processor configured to instruct said information relevance space generator to change the generated information relevance space,
wherein said information relevance space generator changes weights applied to said nodes to regenerate an information relevance space according to an instruction from said information relevance space manipulator.

2. The information managing system according to claim 1, wherein said information relevance space manipulator comprises:
an event detector including at least one of said first and second processor or another processor configured to detect a predetermined event; and
a change instructor including at least one of said first and second processor or another processor configured to instruct said information relevance space generator to change the information relevance space based on the event detected by said event detector.

3. The information managing system according to claim 1, wherein said output controller generates screen information of a display screen including an weight adjuster configured to change weights applied to said nodes; and
said information relevance space manipulator instructs said information relevance space generator to change the information relevance space in response to an instruction to change the weights applied to said nodes which is input from said weight adjuster by the user.

4. An information managing system comprising:
an information relevance space generator including at least one of said first and second processor or another processor configured to generate an information relevance space by placing items of information to be retrieved onto a mapping space having one or more axes based on at least one information attribute other than content of said items of information to be retrieved;
a point-of-view selector including at least one of said first and second processor or another processor configured to select a point of view in said information relevance space for displaying the information to be retrieved;
an output controller including at least one of said first and second processor or another processor configured to generate for generating screen information of a display screen for displaying information included in a predetermined distance from the point of view selected by said point-of-view selector, among information included in said information relevance space generated by said information relevance space generator, wherein:

said information relevance space represents information indicative of the relevance and semantic closeness of said items of information and information indicative of the relevance and semantic closeness of users who retrieves and uses said items of information, and at least a first item and a second item of said items that are not relevant based on contents of said first and second items are determined highly relevant to each other in said information relevance space, said output controller being configured to generate output information for outputting the information to be retrieved based on the information relevance space generated by said information relevance space generator, wherein said information relevance space generator comprises a weighting unit configured to generate said information relevance space by weighting nodes which are represented respectively by said user and said information to be retrieved; and an information relevance space manipulator including at least one of said first and second processor or another processor configured to instruct said information relevance space generator to change the generated information relevance space;

wherein said information relevance space generator changes weights applied to said nodes to regenerate an information relevance space according to an instruction from said information relevance space manipulator.

5. The information managing system according to claim 4, wherein said output controller generates screen information of a display screen including identifying information representative of nodes; and when the user selects and inputs identifying information from said display screen, said point-of-view selector selects a node corresponding to the selected and input identifying information as a point of view in said information relevance space for displaying the information to be retrieved.

6. The information managing system according to claim 5, further comprising:

a point-of-view adder including at least one of said first and second processor or another processor configured to add, to an ACL parameter, point-of-view information representative of a point of view in said information relevance space for displaying the information to be retrieved;

wherein said point-of-view selector selects a point of view in said information relevance space for displaying the information to be retrieved, based on the point-of-view information added to said ACL parameter.

7. The information managing system according to claim 6, further comprising:

a charge information storage unit for storing charge information; and a point-of-view changer including at least one of said first and second processor or another processor configured to change the point-of-view information added to said ACL parameter based on the charge information stored in said charge information storage unit.

8. An information managing system comprising:

an information relevance space generator including at least one of said first and second processor or another processor configured to generate an information relevance space by placing items of information to be retrieved onto a mapping space having one or more axes, based on at least one information attribute other than content of said items of information to be retrieved, a field-of-vision setting unit including at least one of said first and second processor or another processor configured to set a field of vision in said information relevance space for displaying the information to be retrieved;

an output controller including at least one of said first and second processor or another processor configured to generate screen information of a display screen for displaying information included in the field of vision set by said field-of-vision setting unit, among information included in said information relevance space generated by said information relevance space generator, wherein:

said information relevance space represents information indicative of the relevance and semantic closeness of said items of information and information indicative of the relevance and semantic closeness of users who retrieves and uses said items of information, and at least a first item and a second item of said items that are not relevant based on contents of said first and second items are determined highly relevant in said information relevance space;

said output controller being configured to generate output information for outputting the information to be retrieved based on the information relevance space generated by said information relevance space generator, wherein said information relevance space generator comprises a weighting unit configured to generate said information relevance space by weighting nodes which are represented respectively by said user and said information to be retrieved; and an information relevance space manipulator including at least one of said first and second processor or another processor configured to instruct said information relevance space generator to change the generated information relevance space;

wherein said information relevance space generator changes weights applied to said nodes to regenerate an information relevance space according to an instruction from said information relevance space manipulator.

9. The information managing system according to claim 8, wherein said output controller generates screen information of a display screen including a field-of-vision adjuster for changing the field of vision in said information relevance space for displaying the information to be retrieved; and said field-of-vision setting unit changes the field of vision in said information relevance space for displaying the information to be retrieved in response to an instruction to change the field of vision which is input from said field-of-vision adjuster by the user.

10. The information managing system according to claim 1, wherein said information relevance space generator uses said user and said information to be retrieved as nodes, further comprising:

a parameter copying unit configured to copy a parameter of a node other than a particular node to said particular node;

wherein said information relevance space generator generates said information relevance space based on the parameter copied by said parameter copying unit.

11. The information managing system according to claim 10, further comprising:
a setting information specifying unit including at least one of said first and second processor or another processor configured to specify a predetermined node with predetermined setting information;
wherein said parameter copying unit copies a parameter of the node specified by said setting information to said particular node when said information relevance space is newly generated.

12. The information managing system according to claim 1, wherein said information relevance space generator generates an information relevance space including elements representative of said information to be retrieved and placed in a virtual space of plural dimensions as information representative of the relevance between said user and said information to be retrieved.

13. The information managing system according to claim 12, wherein said information relevance space generator generates an information relevance space including elements representative of users and placed in a virtual space of plural dimensions.

14. The information managing system according to claim 12, wherein said information relevance space generator updates said information relevance space by moving elements placed in a virtual space of plural dimensions.

15. A method of managing information, comprising the steps of:
setting a parameter representative of one or more attributes of a user and one or more information attributes of items of information to be retrieved;
generating an information relevance space, using at least one processor, by placing the items of information to be retrieved onto a mapping space having one or more axes, based on the set parameter,
wherein:
at least one of said one or more information attributes is an attribute other than content of said items of information to be retrieved,
said information relevance space represents information indicative of the relevance and semantic closeness of said items of information and information indicative of the relevance and semantic closeness of users who retrieves and uses said items of information, and
at least a first item and a second item of said items that are not relevant based on contents of said first and second items are determined highly relevant to each other in said information relevance space;
generating screen information of a display screen including an weight adjuster for changing weights applied to nodes which are represented respectively by said user and said information to be retrieved;
changing the information relevance space in response to an instruction to change the weights applied to said nodes which is input from said weight adjuster by the user;
generating screen information of a display screen including a field-of-vision adjuster for changing a field of vision in said information relevance space for displaying the information to be retrieved; and
changing the field of vision in said information relevance space for displaying the information to be retrieved in response to an instruction to change the field of vision which is input from said field-of-vision adjuster by the user.

16. An information managing program for enabling a computer to perform a process comprising the steps of:
setting a parameter representative of one or more user attributes of a user and one or more information attributes of items of information to be retrieved;
generating an information relevance space, using at least one processor, by placing the items of information to be retrieved onto a mapping space having one or more axes, based on the set parameter,
wherein:
at least one of said one or more information attributes is an attribute other than content of said items of information to be retrieved,
said information relevance space represents information indicative of the relevance and semantic closeness of said items of information and information indicative of the relevance and semantic closeness of users who retrieves and uses said items of information, and
at least a first item and a second item of said items that are not relevant based on contents of said first and second items are determined highly relevant to each other in said information relevance space;
generating screen information of a display screen including an weight adjuster for changing weights applied to nodes which are represented respectively by said user and said information to be retrieved;
changing the information relevance space in response to an instruction to change the weights applied to said nodes which is input from said weight adjuster by the user;
generating screen information of a display screen including a field-of-vision adjuster for changing a field of vision in said information relevance space for displaying the information to be retrieved; and
changing the field of vision in said information relevance space for displaying the information to be retrieved in response to an instruction to change the field of vision which is input from said field-of-vision adjuster by the user.

17. The information managing system according to claim 1, wherein:
said parameter represents one or more user attributes of at least two users including said user and one or more information attributes of information to be retrieved, and
said first item and said second item are determined to be highly relevant if both said first item and said second item have been referred to, reviewed, or edited, at same time or in a predetermined period, by one of the at least two users.

18. The information managing system according to claim 1, wherein:
said parameter represents one or more user attributes of at least two users including said user and one or more information attributes of information to be retrieved,
said first item and said second item are determined to be highly relevant if said first item and said second item are referred to, browsed, or edited, at same time or in a predetermined period, by a first user and a second user of said at least two users respectively, and
said first user and said second user are highly related to each other based on at least one of said one or more user attributes.

19. The information managing system according to claim 18, wherein said first user and said second user are determined to be highly related to each other if said first user and said second user are closely affiliated in an organization or if both said first user and said second user have browsed or edited, at same time or in a predetermined period, a same item of said items.

20. The information managing system according to claim 1, wherein nodes in the information relevance space may be linked to each other when the nodes are explicitly related to each other, regardless the semantic distance between the nodes.

* * * * *